United States Patent
Miki et al.

(10) Patent No.: US 9,799,095 B2
(45) Date of Patent: Oct. 24, 2017

(54) PERIPHERAL IMAGE PROCESSING FOR DISPLAY SCREEN WITH A CURVED SURFACE

(71) Applicant: JOLED Inc., Tokyo (JP)

(72) Inventors: Daisuke Miki, Tokyo (JP); Junichi Yamashita, Tokyo (JP)

(73) Assignee: JOLED Inc., Tokyo (JP)

( * ) Notice: Subject to any disclaimer, the term of this patent is extended or adjusted under 35 U.S.C. 154(b) by 60 days.

(21) Appl. No.: 14/472,745

(22) Filed: Aug. 29, 2014

(65) Prior Publication Data

US 2015/0097858 A1    Apr. 9, 2015

(30) Foreign Application Priority Data

Oct. 7, 2013  (JP) ................................ 2013-209921

(51) Int. Cl.
| | | |
|---|---|---|
| *G09G 5/00* | (2006.01) | |
| *G06T 3/00* | (2006.01) | |
| *G09G 3/00* | (2006.01) | |

(52) U.S. Cl.
CPC ............. *G06T 3/005* (2013.01); *G09G 3/001* (2013.01); *G09G 2380/00* (2013.01)

(58) Field of Classification Search
None
See application file for complete search history.

(56) References Cited

U.S. PATENT DOCUMENTS

| 5,396,583 A * | 3/1995 | Chen ...................... G06T 15/04 |
| | | 345/427 |
| 5,534,940 A * | 7/1996 | Sato ......................... G09G 3/20 |
| | | 348/556 |
| 5,748,194 A * | 5/1998 | Chen ...................... G06T 15/10 |
| | | 345/427 |
| 6,266,069 B1 * | 7/2001 | Thagard .................... G09F 9/35 |
| | | 345/638 |
| 6,462,769 B1 * | 10/2002 | Trowbridge ........... A63G 31/16 |
| | | 348/51 |
| 2003/0035482 A1 * | 2/2003 | Klompenhouwer ... H04N 5/145 |
| | | 375/240.16 |
| 2005/0140575 A1 * | 6/2005 | Huang .................... G06T 3/005 |
| | | 345/15 |

(Continued)

FOREIGN PATENT DOCUMENTS

| JP | 2008-187729 | 8/2008 |
| JP | 2010-164869 | 7/2010 |
| JP | 2010-224207 | 10/2010 |

OTHER PUBLICATIONS

Zwart (Adrienne Zwart, "How to Extend the Canvas of Your Photo", www.iheartfaces.com/2012/12/extending-canvas-inphotoshop, available from Internet Archive on Dec. 8, 2012).*

*Primary Examiner* — William Beutel
(74) *Attorney, Agent, or Firm* — Michael Best & Friedrich LLP

(57) ABSTRACT

Provided is an image processing device that includes: an image generation section configured to generate a peripheral image in an outer periphery of a first frame image to generate a second frame image that includes the first frame image and the peripheral image; and a coordinate conversion section configured to perform coordinate conversion on the second frame image to generate a third frame image.

18 Claims, 19 Drawing Sheets

(56) References Cited

U.S. PATENT DOCUMENTS

| | | | |
|---|---|---|---|
| 2007/0132788 A1* | 6/2007 | Heo | G09G 5/02 345/660 |
| 2010/0079478 A1* | 4/2010 | Hasegawa | H04N 9/3185 345/589 |
| 2011/0141352 A1* | 6/2011 | Burns | H04N 7/0127 348/452 |
| 2011/0286670 A1* | 11/2011 | Magai | G06K 9/4671 382/195 |
| 2012/0235893 A1* | 9/2012 | Phillips | G06F 3/012 345/156 |
| 2013/0050422 A1* | 2/2013 | Flynn | H04N 13/0438 348/43 |
| 2013/0207946 A1* | 8/2013 | Kim | G09G 3/3225 345/204 |
| 2013/0215298 A1* | 8/2013 | Kawabe | G06T 5/006 348/241 |
| 2013/0307948 A1* | 11/2013 | Odake | H04N 13/0484 348/59 |
| 2014/0218408 A1* | 8/2014 | Kwon | G06F 3/0487 345/660 |

* cited by examiner

|  | 0 | 1 | 2 | 3 | ... | 1918 | 1919 |
|---|---|---|---|---|---|---|---|
| 0 | 5, 5 | 6, 7 | 7, 9 | 8, 11 | ... | 1913, 7 | 1914, 5 |
| 1 | 5, 6 | 6, 8 | 7, 10 | 8, 13 | ... | 1913, 8 | 1914, 6 |
| 2 | 5, 7 | 6, 9 | 7, 11 | 8, 15 | ... | 1913, 9 | 1914, 7 |
| 3 | 5, 8 | 6, 10 | 7, 12 | 8, 17 | ... | 1913, 10 | 1914, 8 |
| ... | ... | ... | ... | ... | ... | ... | ... |
| 1078 | 5, 1073 | 6, 1071 | 7, 1069 | 8, 1066 | ... | 1913, 1071 | 1914, 1073 |
| 1079 | 5, 1074 | 6, 1072 | 7, 1070 | 8, 1068 | ... | 1913, 1072 | 1914, 1074 |

FIG. 7

PERIPHERAL IMAGE PROCESSING FOR DISPLAY SCREEN WITH A CURVED SURFACE

CROSS REFERENCE TO RELATED APPLICATIONS

This application claims the benefit of Japanese Priority Patent Application JP 2013-209921 filed on Oct. 7, 2013, the entire contents of which are incorporated herein by reference.

BACKGROUND

The present disclosure relates to an image processing device that performs processing on an image signal, an image processing method used for the image processing device, and a display device including the image processing device.

In recent years, there has been developed various display devices capable of giving enhanced feeling of presence by curving their display screens. For example, Japanese Unexamined Patent Application Publication No. 2008-187729 discloses a display device having a projector and a hemispherical display screen. Moreover Japanese Unexamined Patent Application Publication No. 2010-224459 teaches a display device having a projector and a cylindrical display screen. Further, Japanese Unexamined Patent Application Publication No. 2010-164869 discloses a display device provided with a curved surface display having a curved display screen.

In these display devices, an input image is subject to distortion correction processing, and the corrected image is displayed. Thus, in these display devices, when a user views a displayed image displayed on the curved display screen, it is possible to reduce a possibility that the user has a sensation of distortion in the displayed image. Further, in Japanese Unexamined Patent Application Publication No. 2010-224207, when correction is performed on an input image, in order to prevent a displayed image from protruding beyond the screen, luminance information on a part to be protruded is set to a black level. Thus, it is possible to reduce a possibility that a user feels unnaturalness in viewing the displayed image.

SUMMARY

In general, in display devices, high image quality is desired, and also in display devices with such enhanced feeling of presence, further improvement in image quality is expected.

It is desirable to provide an image processing device that makes it possible to improve image quality, an image processing method, and a display device.

According to an embodiment of the present disclosure, there is provided an image processing device including: an image generation section configured to generate a peripheral image in an outer periphery of a first frame image to generate a second frame image that includes the first frame image and the peripheral image; and a coordinate conversion section configured to perform coordinate conversion on the second frame image to generate a third frame image.

According to an embodiment of the present disclosure, there is provided an image processing method including: generating a peripheral image in an outer periphery of a first frame image to generate a second frame image that includes the first frame image and the peripheral image; and performing coordinate conversion on the second frame image to generate a third frame image.

According to an embodiment of the present disclosure, there is provided a display device including: an image generation section configured to generate a peripheral image in an outer periphery of a first frame image to generate a second frame image that includes the first frame image and the peripheral image; a coordinate conversion section configured to perform coordinate conversion on the second frame image to generate a third frame image; and a display section configured to perform display operation, based on the third frame image.

In the image processing device, the image processing method, and the display device according to the above-described embodiments of the present disclosure, the second frame image is generated based on the first frame image, and the coordinate conversion is performed on the second frame image. The second frame image includes the first frame image and the peripheral image.

According to the image processing device, the image processing method, and the display device in the above-described embodiments of the present disclosure, since the peripheral image is generated in the outer periphery of the first frame image, and the second frame image is generated that includes the first frame image and the peripheral image, it is possible to improve image quality. It is to be noted that some effects described here are not necessarily limitative, and any of other effects described herein may be achieved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 7 is an explanatory diagram illustrating one example of a configuration of a look-up table.

DETAILED DESCRIPTION

In the following, some embodiments of the present disclosure will be described in detail with reference to the accompanying drawings.

Embodiment

Configuration Example

Figure 1:
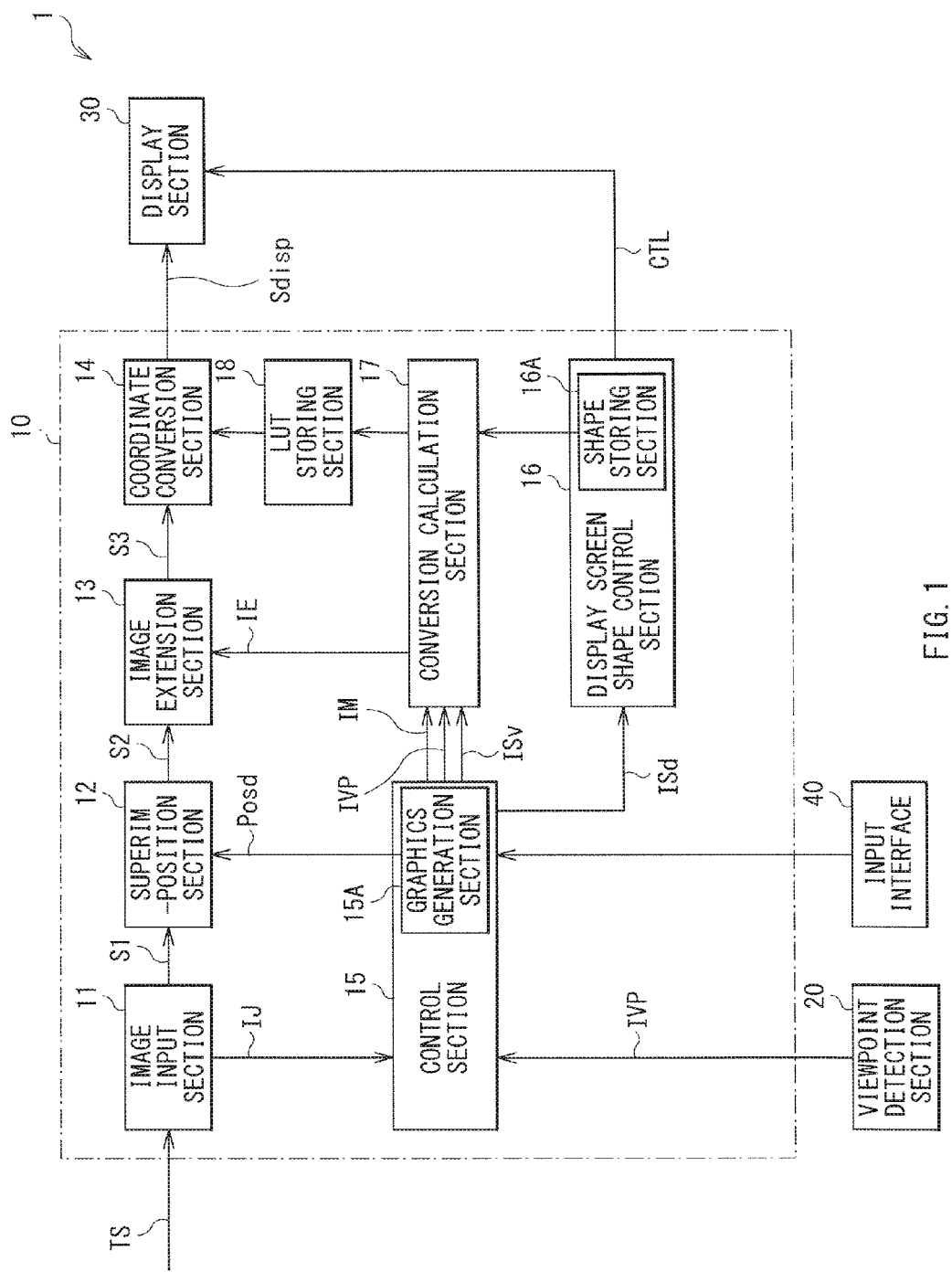
FIG. 1 is a block diagram illustrating one example of a configuration of a display device according to an embodiment of the present disclosure.

FIG. 1 illustrates one example of a configuration of a display device according to an embodiment of the present disclosure. The display device 1 is a so-called flexible display device that allows a curvature of a display screen to be varied. It is to be noted that since an image processing device and an image processing method according to respective example embodiments of the disclosure are embodied by this embodiment, they are described together. The display device 1 includes a display section 30, a viewpoint detection section 20, an input interface 40, and an image processing section 10.

The display section 30 is configured to perform display based on an image signal Sdisp, and in this example, has a laterally-long display screen Sd with an aspect ratio of 16:9. The display section 30 is configured to allow a shape (or a curvature) of the display screen Sd to be varied based on a control signal CTL. The display section 30 may be configured of, for example, an organic EL (Electro Luminescence) display element.

Figure 2:
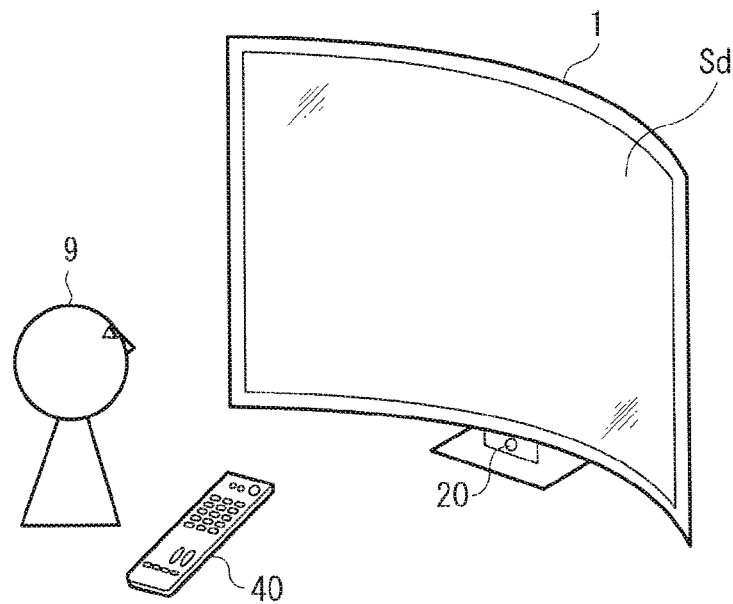
FIG. 2 is an explanatory diagram illustrating one example of a configuration of the display device illustrated in FIG. 1.

FIG. 2 is a schematic diagram illustrating one example of an appearance configuration of the display device 1. As illustrated in FIG. 2, the display device 1 may have a configuration in which the display screen Sd is curved with a radius of curvature Rd, and a left end and a right end of the display screen Sd bend toward a user 9. Thus, the display screen Sd is configured of a curved surface, which makes it possible for the user 9 to have more enhanced feeling of presence when viewing a displayed image, as compared to an ordinary display device with a display screen of a flat surface. In addition, as described later, the display device 1 is configured to allow the shape (or the curvature) of the display screen Sd to be varied based on an operation by the user 9.

The viewpoint detection section 20 detects a viewpoint position VP of the user 9 who is observing the displayed image on the display device 1. The viewpoint detection section 20 includes, for example, a camera, and is configured to obtain the viewpoint position VP of the user 9 based on an image taken by the camera. It is to be noted that this is not limitative, and it is possible to obtain the viewpoint position VP of the user 9 based on an image taken by, for example, an infrared camera. Then, the viewpoint detection section 20 supplies the viewpoint position VP of the user 9 thus obtained to the image processing section 10 as viewpoint position information IVP.

The input interface 40 may be configured of, for example, a remote controller. The user 9 may use the input interface 40 to perform various kinds of setting of the display device 1 while watching an OSD (On-Screen Display) picture Posd displayed on the display section 30.

The image processing section 10 is, as illustrated in FIG. 1, configured to generate the image signal Sdisp and the control signal CTL on the basis of a transport stream TS and of the viewpoint position information IVP, and is configured to supply them to the display section 30. The transport stream TS may be, in this example, a data stream that is compressed in compliance with MPEG (Moving Picture Experts Group)-2 standard, and includes image information including a series of frame images F1 on a time axis, sound information, and attribute information on the image information and the sound information. The attribute information may include, for example, genre information IJ that indicates a genre of contents of picture information. The genre information IJ may be, in this example, described in a content descriptor that is included in EIT (Event Information Table) in the MPEG-2 standard.

The image processing section 10 includes an image input section 11, a superimposition section 12, an image extension section 13, a coordinate conversion section 14, a control section 15, a display screen shape control section 16, a conversion calculation section 17, and an LUT storing section 18.

The image input section 11 is configured to extract the image information including the series of frame images F1 from the transport stream TS to supply the extracted image information to the superimposition section 12 as a signal S1, and is configured to extract the genre information IJ to supply the extracted genre information IJ to the control section 15.

The superimposition section 12 is configured to superimpose the OSD picture Posd supplied from the control section 15 on each of the frame images F1 included in the signal S1 to generate frame images F2, and is configured to supply a signal S2 including the frame images F2 to the image extension section 13.

The image extension section 13 is, as described later, configured to extend the frame image F2, based on extension range information IE, by adding a peripheral image FP to an outer periphery of the frame image F2 included in the signal S2 to generate a frame image F3, and is configured to supply a signal S3 including the frame image F3 to the coordinate conversion section 14.

The coordinate conversion section 14 is configured to perform coordinate conversion on each of the frame images F3 included in the signal S3 using a later-described look-up table (LUT) 18A stored in the LUT storing section 18 to generate frame images F4, and is configured to supply the image signal Sdisp including the frame images F4 to the display section 30.

Figure 3:
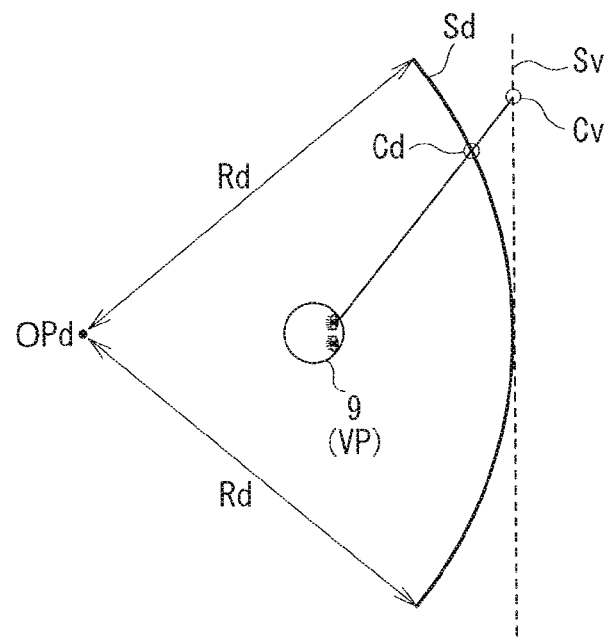
FIG. 3 is an explanatory diagram illustrating one operation example of a coordinate conversion section illustrated in FIG. 1.

FIG. 3 illustrates the coordinate conversion at the coordinate conversion section 14. In this example, the display screen Sd of the display section 30 configures a part of a cylinder of a radius of curvature Rd centering at an origin OPd. In the display device 1, first, there is set a virtual screen Sv, that is, a virtual screen on which the frame images F3 included in the signal S3 are displayed. It is to be noted that the virtual screen Sv is a flat surface in this example, but it is possible to set the virtual screen Sv to be of various shapes (curvatures) as described later. The coordinate conversion section 14 performs coordinate conversion from a coordinate Cv on the virtual screen Sv to a coordinate Cd on the actual display screen Sd of the display section 30. Specifically, the coordinate conversion section 14 converts the coordinate Cv to the coordinate Cd so that the viewpoint position VP of the user 9, the coordinate Cd on the display screen Sd, and the coordinate Cv on the virtual screen Sv are aligned in line. Then, the display section 30 displays the frame images F4 after subjected to the coordinate conversion on the display screen Sd. In this way, it is possible for the user 9 who observes the display screen of the display section 30 to feel as if the frame images F3 before the coordinate conversion is being displayed on the virtual screen Sv.

Figure 4A:
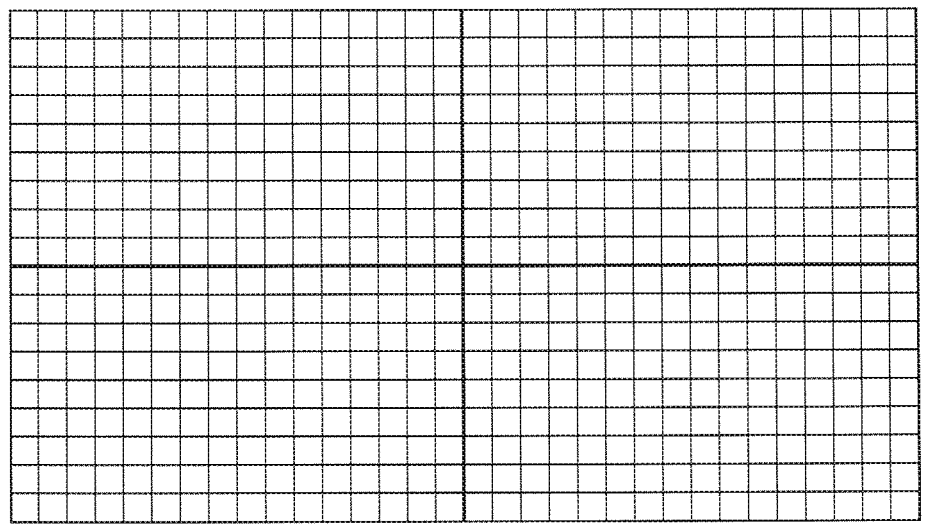
FIG. 4A is an explanatory diagram illustrating one example of a frame image before coordinate conversion.
Figure 4B:
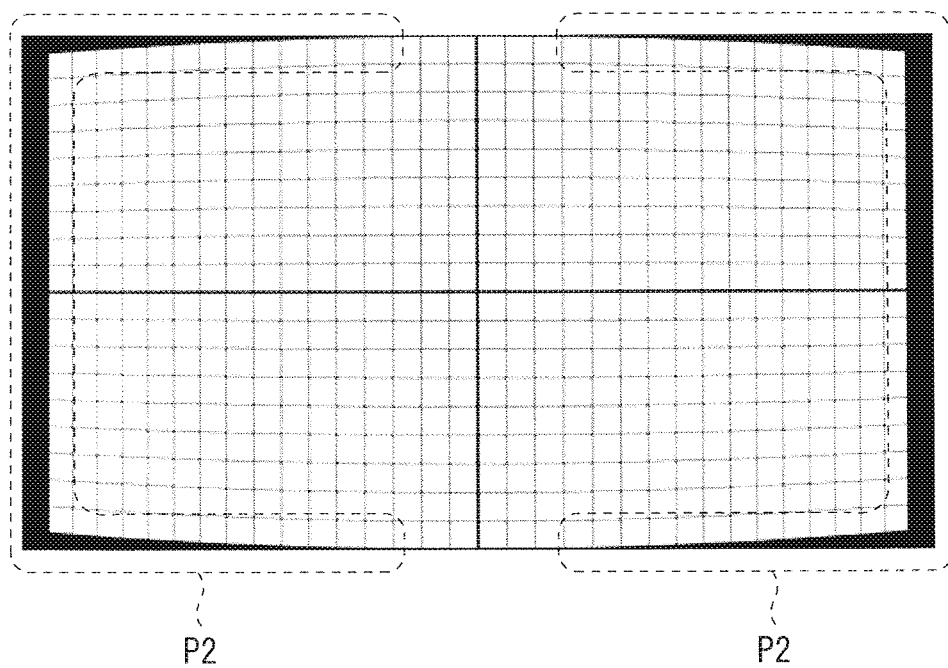
FIG. 4B is an explanatory diagram illustrating one example of a frame image after the coordinate conversion.

FIG. 4A illustrates one example of the frame image F3 before the coordinate conversion, and FIG. 4B illustrates one example of the frame image F4 after the coordinate conversion. The coordinate conversion by the coordinate conversion section 14 allows the horizontal width of the image to be narrowed, and allows the vertical height of the image to be shortened as shifts from the center toward the right and the left sides. Consequently, as illustrated in FIG. 4B, in the frame image F4 after the coordinate conversion, a part P2 with no luminance information occurs. If the frame image F4 is displayed on the display screen Sd of the display section 30, there is a possibility that the user 9 feels as if the display screen Sd had shrunk, which may spoil the feeling of presence. In other words, in such a case, the user 9 may feel as if image quality was degraded.

In the display device 1, as described later, in order to reduce a possibility of occurrence of the part P2, the image extension section 13 adds the peripheral image FP in advance to the outer periphery of the frame images F2 included in the signal S2 to extend the frame images F2. This makes it possible to reduce the possibility that the user 9 feels as if image quality was degraded.

The control section 15 is configured to control processing operation in the display device 1. The display device 1, as described later, has a plurality of display modes (display modes M1 to M5 and an automatic mode M6) for setting a shape of the vertical screen Sv. This makes it possible for the user 9 to obtain various visual effects on the display device 1. The control section 15 selects one of the display modes M1 to M5 and the automatic mode M6, based on an instruction from the input interface 40. In a case in which the automatic mode M6 is selected, the control section 15, as described later, selects again one of the display modes M1 to M5, based on the genre information IJ. Then, the control section 15 notifies the conversion calculation section 17 of the selected display mode as mode information IM.

The control section 15 includes a graphics generation section 15A. The graphics generation section 15A is configured to generate the OSD picture Posd for various setting of the display device 1, based on an instruction from the input interface 40. The control section 15 allows the superimposition section 12 to superimpose the OSD picture Posd on the frame images F1.

The control section 15 also has a function of deciding, based on an instruction from the input interface 40, the shape of the display screen Sd of the display section 30 and notifying the display screen shape control section 16 of the information on the shape as display screen shape information ISd. Moreover, the control section 15 has a function of deciding, based on an instruction from the input interface 40, the shape of the virtual screen Sv and notifying the conversion calculation section 17 of the information on the shape as virtual screen shape information ISv. Further, the control section 15 has a function of obtaining the viewpoint position information IVP of the user 9 from the viewpoint detection section 20 and supplying the obtained viewpoint position information IVP to the conversion calculation section 17.

The display screen shape control section 16 is configured to control, based on the display screen shape information ISd supplied from the control section 15, the display section 30 through the control signal CTL and is configured to allow the shape of the display screen Sd of the display section 30 to be varied. The display screen shape control section 16 includes a shape storing section 16A. The shape storing section 16A is configured to store the display screen shape information ISd.

The conversion calculation section 17 is configured to generate a look-up table 18A that is used when the coordinate conversion section 14 performs the coordinate conversion, based on the mode information IM, the viewpoint position information IVP, and the virtual screen shape information ISv that are supplied from the control section 15, and on the display screen shape information ISd that is stored in the shape storing section 16A, and is configured to supply the look-up table 18A to the LUT storing section 18. The look-up table 18A indicates a relationship of each of the coordinates Cv on the virtual screen Sv and each of the coordinates Cd on the display screen Sd.

The conversion calculation section 17 also has a function of generating the extension range information IE that indicates a range of the peripheral image FP to be added to the outer periphery of the frame images F2, and supplying the extension range information IE to the image extension section 13. The extension range information IE indicates a range in which the frame images F2 is to be extended, in order to reduce the possibility of occurrence of the part P2 illustrated in FIG. 4B.

The LUT storing section 18 is configured to store the look-up table 18A. The coordinate conversion section 14 performs the coordinate conversion with reference to the look-up table 18A. This makes it possible for the coordinate conversion section 14 to perform the coordinate conversion more easily.

By the configuration, the image extension section 13 generates the peripheral image FP based on the extension range information IE, and adds the peripheral image FP to the frame images F2 to generate the frame images F3. Then, the coordinate conversion section 14 performs the coordinate conversion on the frame images F3 using the look-up table 18A to generate the frame images F4. The display section 30 displays the frame images F4. Thus, in the display device 1, it is possible to reduce the possibility of occurrence of the part P2 as illustrated in FIG. 4B.

The frame image F2 corresponds to a specific but not limitative example of "first frame image" in one embodiment of the disclosure. The frame image F3 corresponds to a specific but not limitative example of "second frame image" in one embodiment of the disclosure. The frame image F4 corresponds to a specific but not limitative example of "third frame image" in one embodiment of the disclosure. The image extension section 13 corresponds to a specific but not limitative example of "image generation section" in one embodiment of the disclosure. The coordinate conversion section 14, the control section 15, the conversion calculation section 17, and the LUT storing section 18 collectively correspond to a specific but not limitative example of "coordinate conversion section" in one embodiment of the disclosure.

[Operation and Functions]

Operation and functions of the display device 1 of the example embodiment are now described.

(Summary of Overall Operation)

First, summary of overall operation of the display device 1 is described with reference to FIG. 1 and so on. The image input section 11 extracts the image information including the series of frame images F1 from the transport stream TS to supply the extracted image information to the superimposition section 12 as the signal S1, and extracts the genre information IJ to supply the extracted genre information IJ to the control section 15. The superimposition section 12 superimposes the OSD picture Posd supplied from the control section 15 on each of the frame images F1 to generate frame images F2, and supplies the signal S2 including the frame images F2 to the image extension section 13. The image extension section 13 extends, based on the extension range information IE, the frame images F2 by adding the peripheral image FP to the outer periphery of the frame images F2 to generate the frame images F3, and supplies the signal S3 including the frame images F3 to the coordinate conversion section 14. The coordinate conversion section 14 performs the coordinate conversion on each of the frame images F3 using the look-up table 18A stored in the LUT storing section 18 to generate the frame images F4, and generates the image signal Sdisp including the frame images F4. The viewpoint detection section 20 detects the viewpoint position VP of the user 9 who is viewing the displayed image on the display device 1. The control section 15 controls processing operation in the display device 1. The display screen shape control section 16 controls, based on the display screen shape information ISd, the display section 30 through the control signal CTL and allows the shape of the display screen Sd of the display section 30 to be varied. The conversion calculation section 17 generates, based on the mode information IM, the viewpoint position information IVP, and the virtual screen shape information ISv that are supplied from the control section 15, and on the display screen shape information ISd that is stored in the shape storing section 16A of the display screen shape control section 16, the look-up table 18A and the extension range information IE and supplies the look-up table 18A to the LUT storing section 18 while supplying the extension range information IE to the image extension section 13. The LUT storing section 18 stores the look-up table 18A. The display section 30 performs display based on the image signal Sdisp and allows the shape (or the curvature) of the display screen Sd to be varied based on the control signal CTL.

(Extension of Image and Coordinate Conversion)

In the display device 1, the conversion calculation section 17 generates the look-up table 18A and the extension range information IE. The image extension section 13 generates, based on the extension range information IE, the peripheral image FP and extends the frame image F2 by adding the peripheral image FP to the frame image F2 to generate the frame image F3. Then, the coordinate conversion section 14 performs the coordinate conversion on the frame image F3 using the look-up table 18A. First, prior to detailed description thereof, description is given on a coordinate system used in calculation of the coordinate conversion.

Figure 5:
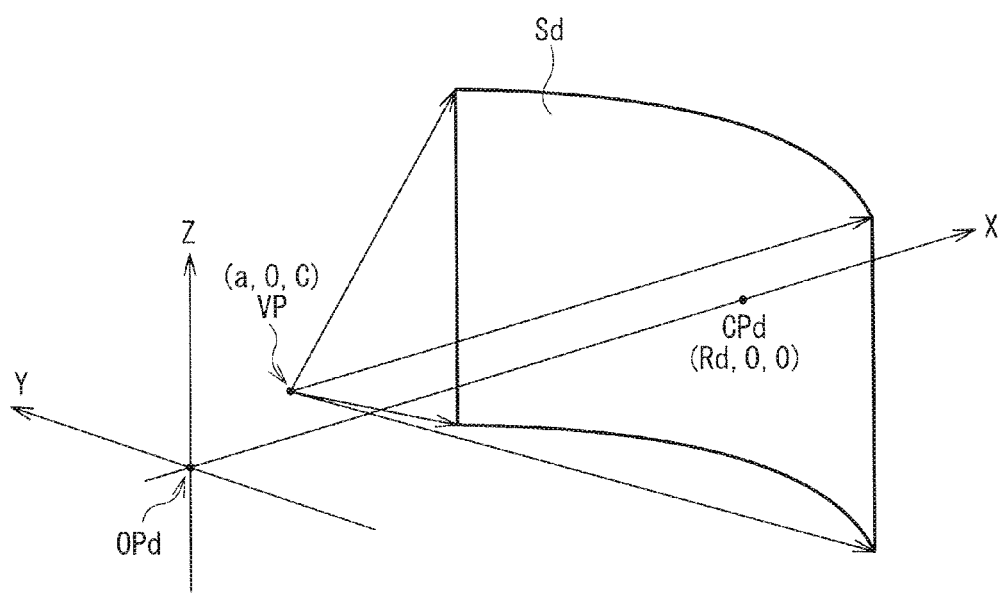
FIG. 5 is an explanatory diagram illustrating the coordinate conversion.

FIG. 5 illustrates the coordinate system used in the calculation of the coordinate conversion. In this example, a direction that starts at the origin OPd and passes a center point CPd of the display screen Sd of the display section 30 is defined as an x axis. A direction that is orthogonal to the x axis in a horizontal plane is defined as a y axis. A normal of the horizontal plane is defined as a z axis. In the coordinate system, a coordinate of the center point CPd is indicated as (Rd, 0, 0) using the radius of curvature Rd of the display screen Sd. A coordinate of the viewpoint position VP is set at (a, 0, c).

The display device 1 has the plurality of display modes M1 to M5 that differ in the shape of the vertical screen Sv, in order to allow the user 9 to obtain various visual effects. In the following, detailed description is given with respect to the coordinate conversion in each of the display modes M1 to M5.

(Display Mode M1: Curved Surface Relieved Mode)

The display mode M1 is a mode where a radius of curvature Rv of the virtual screen Sv is greater than the radius of curvature Rd of the display screen Sd of the display section 30. In the display mode M1, it is possible to allow the user 9 to feel as if the frame image F3 before the coordinate conversion was being displayed on the virtual screen Sv with a more relieved curved surface than the actual display screen Sd.

Figure 6A:
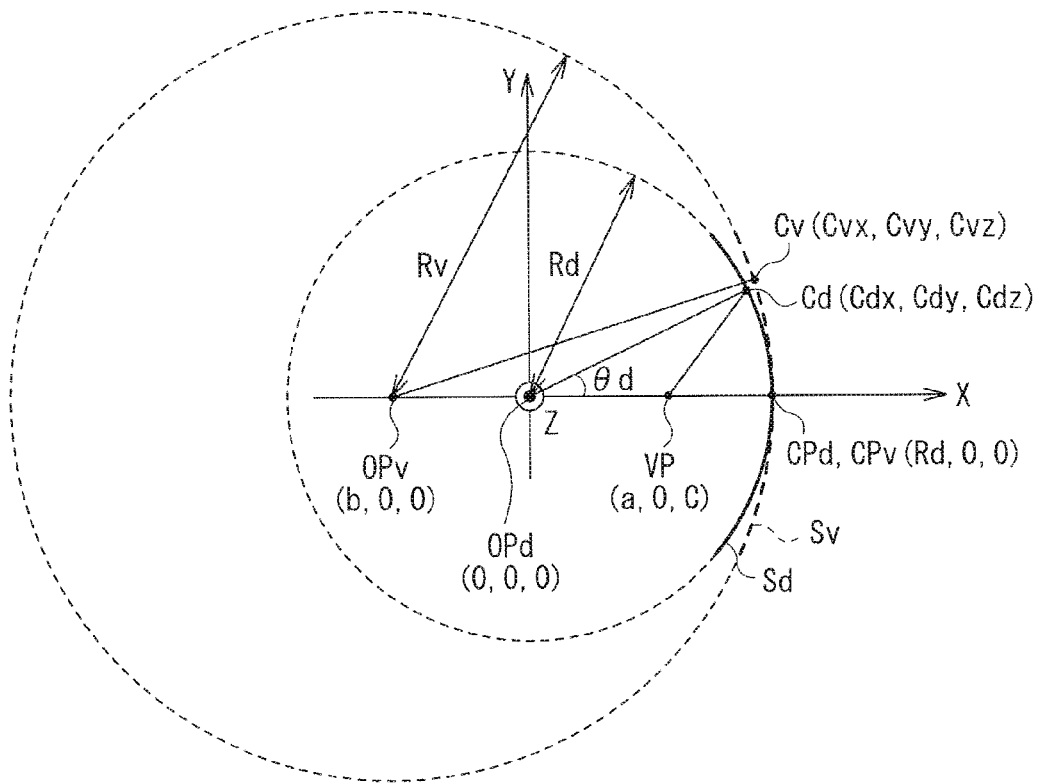
FIG. 6A is an explanatory diagram illustrating one example of the coordinate conversion.
Figure 6B:
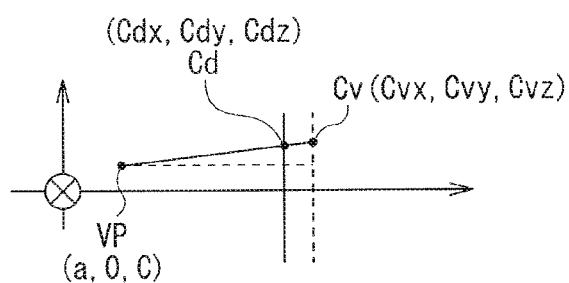
FIG. 6B is another explanatory diagram illustrating one example of the coordinate conversion.

FIGS. 6A and 6B illustrate the display screen Sd and the virtual screen Sv in the display mode M1. FIG. 6A shows a projection on an xy plane, and FIG. 6B shows a projection on an xz plane. In the following calculation, as illustrated in FIG. 6A, the center point CPd of the display screen Sd is made to coincide with the center point CPv of the virtual screen Sv. In FIG. 6A, a center of a circle (or a cylinder) including the virtual screen Sv is indicated by a point OPv. A coordinate of the point OPv is set at (b, 0, 0).

In order to allow the user 9 to feel as if the image displayed on the display screen Sd was being displayed on the virtual screen Sv, the coordinate Cv is converted to the coordinate Cd so that the viewpoint position VP, the coordinate Cd (Cdx, Cdy, Cdz) on the display screen Sd, and the coordinate Cv (Cvx, Cvy, Cvz) on the virtual screen Sv are aligned in line. Thus, the following expression (1) is obtained.

Numerical Expression 1

$$\begin{cases} (x-b)^2 + y^2 = Rv^2 \\ y = \dfrac{Cdy}{Cdx - a}(x - a) \end{cases} \quad (1)$$

The coordinates Cdx and Cdy are represented as follows, using a cylindrical coordinate system with the z axis as a center.

Numerical Expression 2

$$\begin{cases} Cdx = Rd\cos\theta d \\ Cdy = Rd\sin\theta d \end{cases} \quad (2)$$

where θd denotes, as illustrated in FIG. 6A, an angle of a line from the origin OPd toward the coordinates Cd and Cv with respect to the x axis. In other words, the coordinates Cdx and Cdy are functions of the angle θd.

From the expressions (1) and (2), the coordinates Cdx and Cdy are obtained.

Numerical Expression 3

$$\begin{cases} Cvx(\theta d) = \dfrac{t(\theta d)^2 \cdot a + b + \sqrt{t(\theta d)^2 \cdot Rv^2 + Rv^2 - t(\theta d)^2 \cdot (a-b)^2}}{1 + t(\theta d)^2} \\ Cvy(\theta d) = t(\theta d) \cdot (Cvx(\theta d) - a) \end{cases} \quad (3)$$

where t(θd) is a function represented as follows.

Numerical Expression 4

$$t(\theta d) = \dfrac{Cdy}{Cdx - a} = \dfrac{Rd \cdot \sin\theta d}{Rd \cdot \cos\theta d - a} \quad (4)$$

The value b, or an x coordinate of the point OPv, which appears in the expression (3), is represented as follows, using the radii of curvatures Rd and Rv.

Numerical Expression 5

$$b = Rd - Rv \quad (5)$$

The coordinates Cdx, Cdz, Cvx, and Cvz have a relationship as follows, as illustrated in FIG. 6B, by the similarity theorem of a triangle.

$$Cdx-a:Cvx-a=Cdz-c:Cvz-c$$

Using the expression, the coordinate Cvz is represented as follows.

Numerical Expression 6

$$Cvz = (\theta d, Cdz) = \dfrac{Cvx(\theta d) - a}{Rd \cdot \cos\theta d - a}(Cdz - c) + c \quad (6)$$

Thus, as shown in the expressions (3) and (6), the coordinate Cv (Cvx, Cvy, Cvz) is represented by the coordinate Cd (Cdx, Cdy, Cdz). The conversion calculation section 17 uses these expressions, in the display mode M1, to generate the look-up table 18A. Then, the coordinate conversion section 14 performs the coordinate conversion using the look-up table 18A.

FIG. 7 illustrates one example of the look-up table 18A. In this example, provided is an example where the coordinate conversion is performed on the frame image F3 with definition of FHD (Full High Definition). In other words, in this example, the frame image F3 includes horizontally 1920 pieces by vertically 1080 pieces of luminance information. The coordinate conversion section 14 uses the look-up table 18A to perform the coordinate conversion. Specifically, for example, luminance information at a coordinate (0, 0) in the frame image F3 is moved to a coordinate (5, 5), and luminance information at a coordinate (1, 0) in the frame image F3 is moved to a coordinate (6, 7). The coordinate conversion section 14 thus performs the coordinate conversion by moving luminance information at each of the coordinates in the frame image F3 in accordance with the look-up table 18A to generate the frame image F4.

It is to be noted that, in this example, elements of the look-up table 18A are provided at a rate of one element per one pixel in the frame image F3, but this is not limitative. Alternatively, the number of elements of the look-up table 18A may be reduced. For example, the elements of the look-up table 18A may be provided at a rate of one element per 16 pixels in the frame image F3. In this case, the coordinate conversion section 14 performs interpolation processing with respect to each of the elements of the look-up table 18A to perform the coordinate conversion on the frame image F3.

Figure 8:
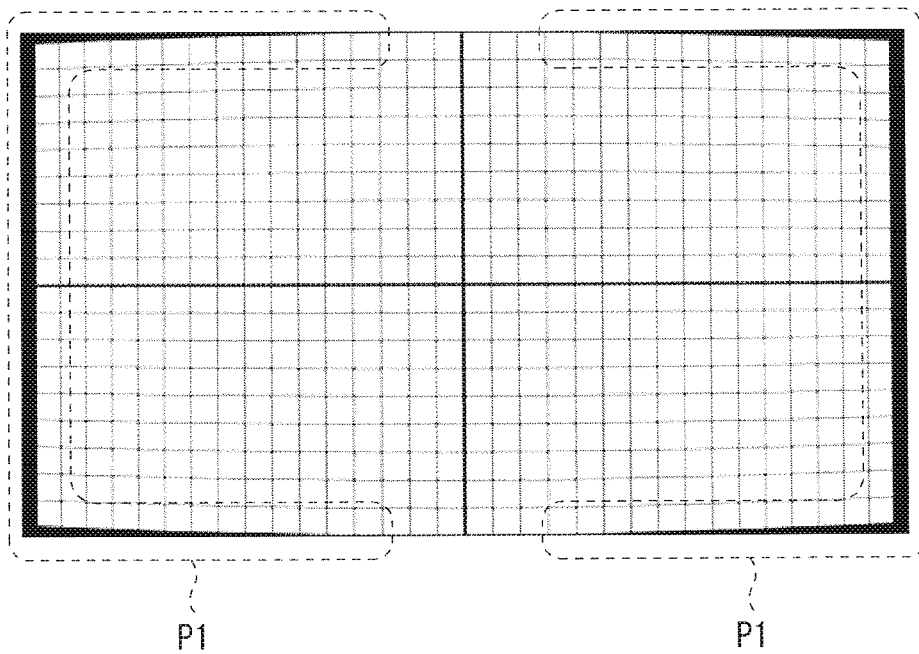
FIG. 8 is an explanatory diagram illustrating one example of a frame image in a case where the coordinate conversion illustrated in FIGS. 6A and 6B is performed.

FIG. 8 illustrates one example of the frame image F4 after the coordinate conversion in a case in which the coordinate conversion is performed on the frame image F3 illustrated in FIG. 4A. In the display mode M1, by performing the coordinate conversion, the horizontal width of the image is narrowed, and the vertical height of the image is shortened as shifts from the center toward the right and the left sides. Consequently, as illustrated in FIG. 8, in the frame images F4 after the coordinate conversion, a part P1 with no luminance information occurs.

In order to reduce the possibility of occurrence of the part P1 in the frame image F4, the image extension section 13 generates, based on the extension range information IE supplied from the conversion calculation section 17, the peripheral image FP and adds the peripheral image FP to the frame images F2 to extend the frame images F2.

Figure 9:
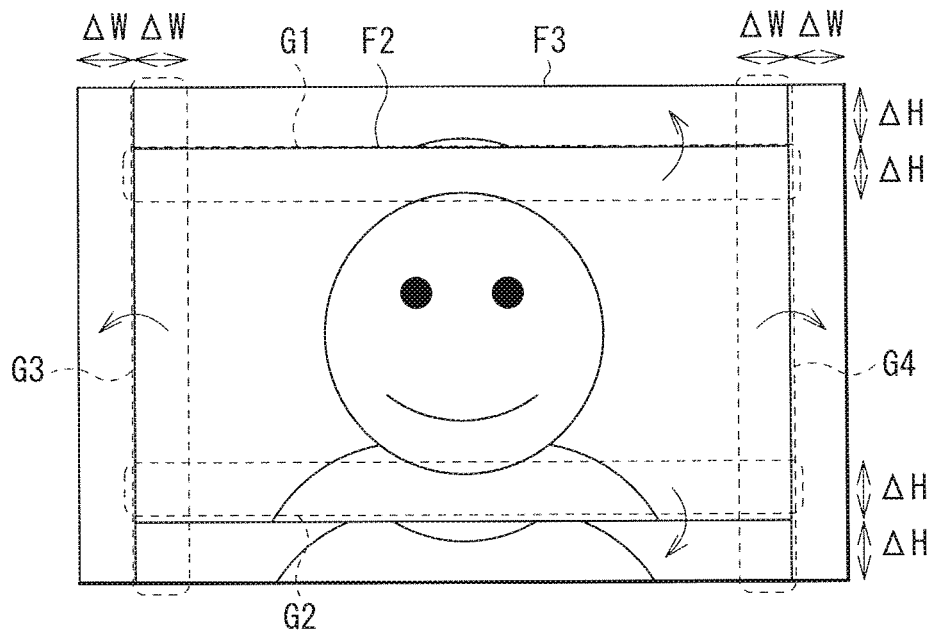
FIG. 9 is an explanatory diagram illustrating one example of an operation of an image extension section illustrated in FIG. 1.

FIG. 9 illustrates an operation of the extension of the frame image F2. In this example, the image extension section 13 arranges an image that is the same as a partial image G1 near an upper side in the frame image F2 over an upper side of the frame image F2 as it is, and arranges an image that is the same as a partial image G2 near an lower side under a lower side of the frame image F2 as it is. Moreover, the image extension section 13 arranges an image that is the same as a partial image G3 near a left side, on the left side of a left side of the frame image F2 as it is, and arranges an image that is the same as a partial image G4 near a right side, on the right side of a right side of the frame image F2 as it is. In this way, the image extension section 13 generates the peripheral image FP using the partial images G1 to G4 within the frame image F2.

At this time, the conversion calculation section 17 determines to what extent the frame image F2 is to be extended in the image extension section 13, and generates the extension range information IE. That is, the conversion calculation section 17 decides a height ΔH of the partial images G1 and G2, and a width ΔW of the partial images G3 and G4 by unit of pixel, and supplies them as the extension range information IE to the image extension section 13. Thus, in the display device 1, it is possible to reduce a possibility that the part P1 as illustrated in FIG. 8 occurs in the displayed image displayed on the display section 30.

It is to be noted that a method of extending the frame image F2 is not limited to the method as above. Various methods may be adoptable as described in the following.

Figure 10:
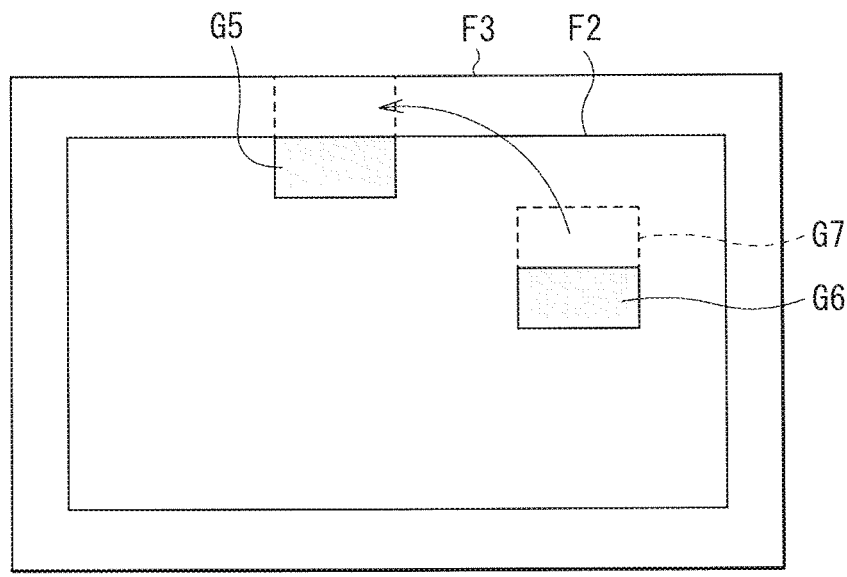
FIG. 10 is an explanatory diagram illustrating another example of the operation of the image extension section illustrated in FIG. 1.

FIG. 10 illustrates another method of extending the frame image F2. This method involves, first, focusing on a partial image G5 near four sides in the frame image F2, and then searching within the frame image F2 for a partial image with a similar pattern to the focused partial image. In a case of presence of a partial image (for example, a partial image G6) with a similar pattern to the focused partial image within the frame image F2, an image that is the same as a partial image G7 near the partial image G6 is arranged near the partial image G5. In this way, the image extension section 13 generates the peripheral image FP by pattern matching within the frame image F2.

Figure 11:
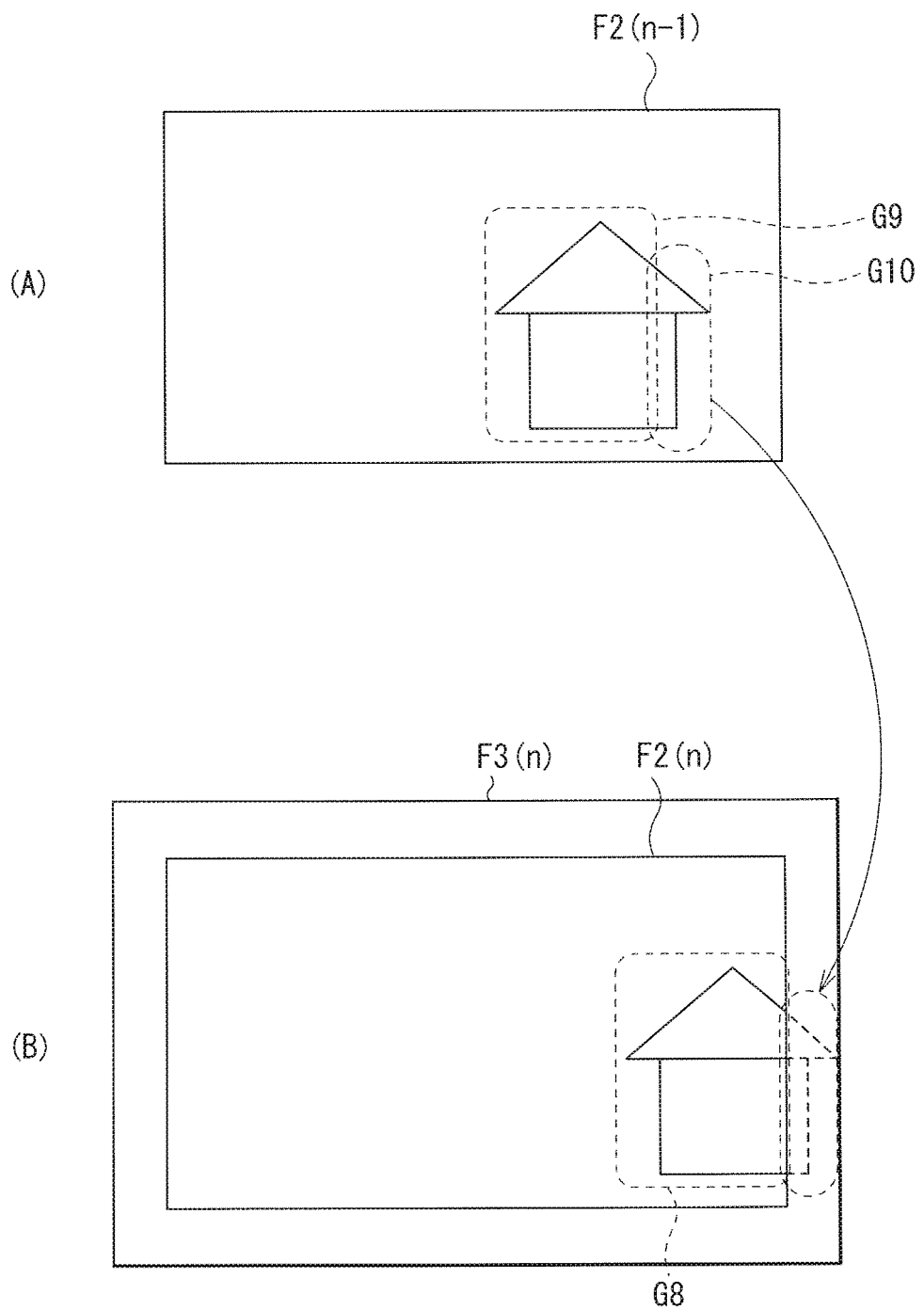
FIG. 11 is an explanatory diagram illustrating another example of an operation of the image extension section illustrated in FIG. 1.

FIG. 11 illustrates still another method of extending the frame image F2. In this method, the frame image F2 is extended based on a plurality of frame images F2 on a time axis. (A) of FIG. 11 illustrates the (n−1)th frame image F2(n−1), and (B) of FIG. 11 illustrates the n-th frame image F2(n) and the frame image F3(n) obtained by extending the frame image F2(n). This method involves, first, focusing on a partial image G8 near four sides in the frame image F2(n) ((B) of FIG. 11), and then searching within the preceding frame image F2(n−1) for a partial image with a similar pattern to the focused partial image ((A) of FIG. 11). In a case of presence of a partial image (for example, a partial image G9) with a similar pattern to the focused partial image within the frame image F2(n−1), an image that is the same as a partial image G10 near the partial image G9 is arranged near the partial image G8.

Thus, various methods are adoptable for the extension operation of the frame image F2. Moreover, methods other than methods described herein may be used. A combination of a plurality of methods may be possible. In an alternative, a filter may be applied to a region extended in this way to blur the image slightly. Thus, discontinuity of the image is lessened, suppressing degradation of image quality.

As described above, in the display device 1, the image extension section 13 extends the frame image F2 to generate the frame image F3, and the coordinate conversion section 14 performs the coordinate conversion on the extended frame image F3. It is therefore possible to reduce a possibility that the part P1 as illustrated in FIG. 8 occurs in the displayed image displayed on the display section 30. In the display device 1, it is possible to reduce a possibility that the user 9 feels as if the display screen Sd had shrunk, enhancing the feeling of presence and improving image quality.

Also, in the display device 1, the conversion calculation section 14 determines to what extent the frame image is to be extended. It is therefore possible for the image extension section 13 to save an amount of calculation and processing time for the image extension processing, and to save an amount of memory for the image extension processing. For example, in a case in which the image extension section is configured to extend the frame image F2 uniformly by the predetermined amount, for example, the frame image F2 is extended even if the part P1 illustrated in FIG. 8 rarely occurs. This results in an increase in an amount of calculation and long time for the processing. In consideration of a case in which area of the part P1 may increase, it is desirable that a relatively large amount of memory be secured for the image extension processing. On the other hand, in the display device 1, the conversion calculation section 14 determines to what extent the frame image F2 is to be extended in the image extension section 13. This allows an amount of calculation in the image extension section 13 to be varied according to area of the part P1 illustrated in FIG. 8. It is therefore possible to save an amount of calculation and processing time for the image extension processing, and to save an amount of memory.

(Display Mode M2: Flat Surface Display Mode)

The display mode M2 is a mode in which the virtual screen Sv is a flat surface. In the display mode M2, it is possible to allow the user 9 to feel as if the frame image F3 before the coordinate conversion was being displayed on a flat surface display. In other words, the display mode M2 is a mode in which distortion in the displayed image is corrected.

Figure 12:
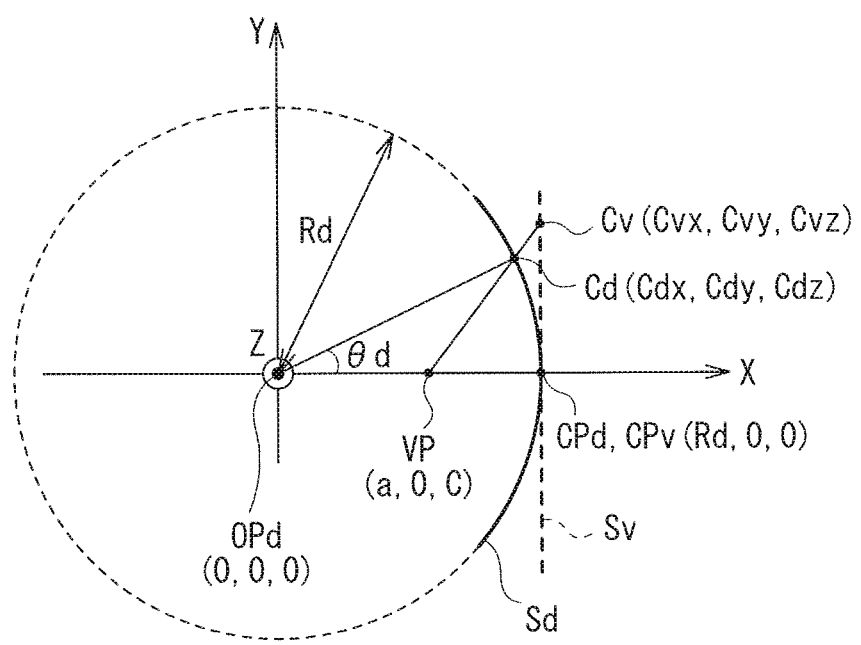
FIG. 12 is an explanatory diagram illustrating another example of the coordinate conversion.

FIG. 12 illustrates the display screen Sd and the virtual screen Sv in the display mode M2, showing a projection on the xy plane. It is to be noted that a projection on the xz plane is similar to FIG. 6B. In the following calculation, as illustrated in FIG. 12, the center point CPd of the display screen Sd is made to coincide with the center point CPv of the virtual screen Sv. Thus, the following expression (7) is obtained.

Numerical Expression 7

$$Cvx = Rd \tag{7}$$

In order to allow the user 9 to feel as if the image displayed on the display screen Sd was being displayed on the virtual screen Sv, similarly to the display mode M1, the coordinate Cv is converted to the coordinate Cd so that the viewpoint position VP, the coordinate Cd (Cdx, Cdy, Cdz) on the display screen Sd, and the coordinate Cv (Cvx, Cvy, Cvz) on the virtual screen Sv are aligned in line. Thus, the following expression (8) is obtained.

Numerical Expression 8

$$Cvy = \frac{Cdy}{Cdx - a}(Rd - a) \tag{8}$$

By the expressions (8) and (2), the coordinate Cvy is represented as follows, using the function t(θd) shown in the expression (4).

Numerical Expression 9

$$Cvy(\theta d) = t(\theta d) \cdot (Rd - a) \tag{9}$$

The coordinate Cvz is obtained in a similar manner to the display mode M1. An expression of the coordinate Cvz is given as follows.

Numerical Expression 10

$$Cvz(\theta d, Cdz) = \frac{Rd - a}{Rd \cdot \cos\theta d - a}(Cdz - c) + c \tag{10}$$

In this way, as shown in the expressions (7), (9), and (10), the coordinate Cv (Cvx, Cvy, Cvz) is represented by the coordinate Cd (Cdx, Cdy, Cdz). The conversion calculation section 17 uses these expressions, in the display mode M2, to generate the look-up table 18A. Then, the coordinate conversion section 14 performs the coordinate conversion using the look-up table 18A. The coordinate conversion section 14 thus performs the coordinate conversion on the frame image F3 illustrated in FIG. 4A to generate the frame image F4 illustrated in, for example, FIG. 4B.

The image extension section 13 generates, based on the extension range information IE, the peripheral image FP and extends the frame image F2 by adding the peripheral image FP to the frame images F2 to generate the frame images F3. It is therefore possible, in the display device 1, to reduce a possibility of occurrence of the part P2 as illustrated in FIG. 4B in the displayed image displayed on the display section 30, and to improve image quality.

(Display Mode M3: Curved Surface Emphasized Mode)

The display mode M3 is a mode where the radius of curvature Rv of the virtual screen Sv is smaller than the radius of curvature Rd of the display screen Sd of the display section 30. In the display mode M3, it is possible to allow the user 9 to feel as if the frame image F3 before the coordinate conversion was being displayed on the virtual screen Sv with a more emphasized curved surface than the actual display screen Sd.

Figure 13:
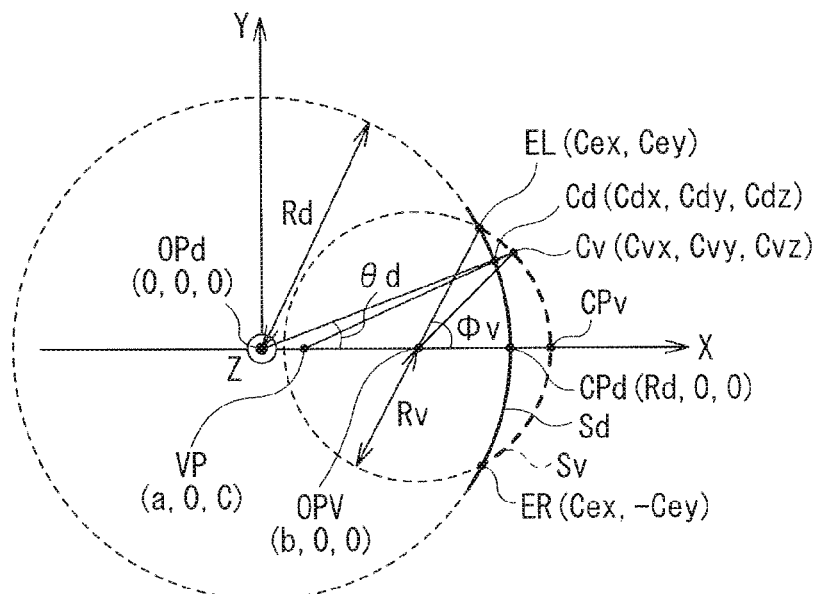
FIG. 13 is an explanatory diagram illustrating another example of the coordinate conversion.

FIG. 13 illustrate the display screen Sd and the virtual screen Sv in the display mode M3, showing a projection on the xy plane. It is to be noted that a projection on the xz plane is similar to FIG. 6B. In the following calculation, as illustrated in FIG. 13 the left end EL and the right end ER of the virtual screen Sv is made to be on a surface of the display screen Sd. This allows, when viewed from the user 9, the entire region of the virtual screen Sv to be settled within the display screen Sd. In FIG. 13, the center of the circle (or the cylinder) including the virtual screen Sv is indicated by the point OPv. The coordinate of the point OPv is set at (b, 0, 0).

In order to allow the user 9 to feel as if the image displayed on the display screen Sd was being displayed on the virtual screen Sv, similarly to the display mode M1 and the like, the coordinate Cv is converted to the coordinate Cd so that the viewpoint position VP, the coordinate Cd (Cdx, Cdy, Cdz) on the display screen Sd, and the coordinate Cv (Cvx, Cvy, Cvz) on the virtual screen Sv are aligned in line. Thus, similarly to the display mode M1, the expressions (1) to (4) and (6) are obtained.

Next, the value b, or the x coordinate of the point OPv, which appears in the expression (3), is obtained. As described above, in this example, the left end EL and the right end ER of the virtual screen Sv is positioned on the surface of the display screen Sd. A coordinate at the left end EL of the virtual screen Sv is set at (Cex, Cey), and a coordinate at the right end ER of the virtual screen Sv is set at (Cex, −Cey). Then, the following expression is obtained.

Numerical Expression 11

$$Cex^2 + Cey^2 = Rd^2 \qquad (11)$$

Further, an angle $\Phi v$ of a line connecting the left end EL of the virtual screen Sv and the point OPv with respect to the x axis is represented as follows, since a width of the virtual screen Sv is equal to a width of the display screen Sd.

Numerical Expression 12

$$\Phi v = \frac{W}{2Rv} \qquad (12)$$

where W denotes the width of the virtual screen Sv and the display screen Sd. Using $\Phi v$, the coordinates Cex and Cey are represented as follows.

Numerical Expression 13

$$\begin{cases} Cex = Rv\cos\Phi v + b \\ Cey = Rv\sin\Phi v \end{cases} \qquad (13)$$

By the expressions (11) to (13), the value b is represented as follows.

Numerical Expression 14

$$b = -Rv\cos\Phi v + \sqrt{Rv^2\cos^2\Phi v + Rd^2 - Rv^2} \qquad (14)$$

In this way, as shown in the expressions (1) to (4), and (14), the coordinate Cv (Cvx, Cvy, Cvz) is represented by the coordinate Cd (Cdx, Cdy, Cdz). The conversion calculation section 17 uses these expressions, in the display mode M3, to generate the look-up table 18A. Then, the coordinate conversion section 14 performs the coordinate conversion using the look-up table 18A.

Figure 14:
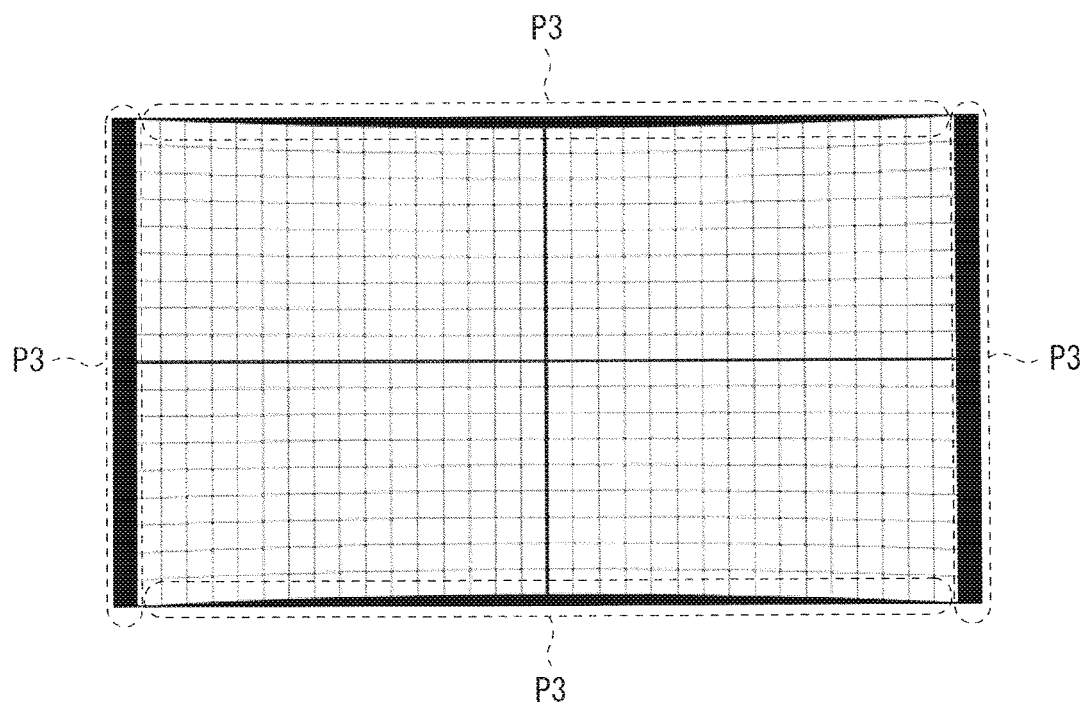
FIG. 14 is an explanatory diagram illustrating one example of a frame image in a case where the coordinate conversion illustrated in FIG. 13 is performed.

FIG. 14 illustrates one example of the frame image F4 after the coordinate conversion in a case where the coordinate conversion is performed on the frame image F3 illustrated in FIG. 4A. In the display mode M3, by performing the coordinate conversion, the horizontal width of the image is narrowed, and the vertical height of the image is increased as shifts from the center toward the right and the left sides. Consequently, as illustrated in FIG. 14, in the frame images F4 after the coordinate conversion, a part P3 with no luminance information occurs.

The image extension section 13 generates, based on the extension range information IE, the peripheral image FP and extends the frame image F2 by adding the peripheral image FP to the frame images F2 to generate the frame images F3. It is therefore possible, in the display device 1, to reduce a possibility of occurrence of the part P3 as illustrated in FIG. 14 in the displayed image displayed on the display section 30, and to improve image quality.

(Display Mode M4: Protrusively Curved Surface Mode)

The display mode M4 is a mode where the center of the virtual screen Sv is set to be protrusively bent toward the user 9. In the display mode M4, it is possible to allow the user 9 to feel as if the frame image F3 before the coordinate conversion was being displayed on the virtual screen Sv that is curved in an opposite direction to the actual display screen Sd.

Figure 15:
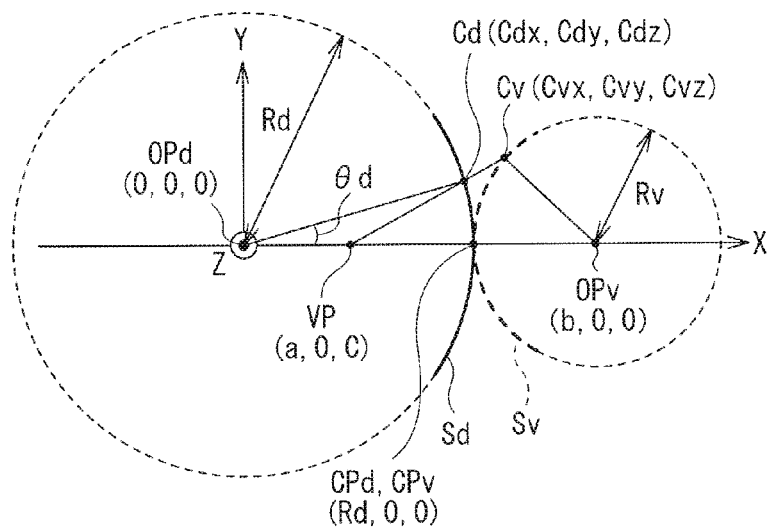
FIG. 15 is an explanatory diagram illustrating another example of the coordinate conversion.

FIG. 15 illustrates the display screen Sd and the virtual screen Sv in the display mode M4, showing a projection on the xy plane. It is to be noted that a projection on the xz plane is similar to FIG. 6B. In the following calculation, as illustrated in FIG. 15, the center point CPd of the display screen Sd is made to coincide with the center point CPv of the virtual screen Sv.

In order to allow the user 9 to feel as if the image displayed on the display screen Sd was being displayed on the virtual screen Sv, similarly to the display mode M1 and the like, the coordinate Cv is converted to the coordinate Cd so that the viewpoint position VP, the coordinate Cd (Cdx, Cdy, Cdz) on the display screen Sd, and the coordinate Cv (Cvx, Cvy, Cvz) on the virtual screen Sv are aligned in line. Thus, the coordinates Cvx and Cvy are obtained in a similar manner to the above-described display mode M1.

Numerical Expression 15

$$\begin{cases} Cvx(\theta d) = \dfrac{t(\theta d)^2 \cdot a + b - \sqrt{t(\theta d)^2 \cdot Rv^2 + Rv^2 - t(\theta d)^2 \cdot (a-b)^2}}{1 + t(\theta d)^2} \\ Cvy(\theta d) = t(\theta d) \cdot (Cvx(\theta d) - a) \end{cases} \quad (15)$$

where t(θd) denotes the function represented by the expression (4). The value b, or the x coordinate of the point OPv, which appears in the expression (15) is represented as follows, using the radii of curvatures Rd and Rv.

Numerical Expression 16

$$b = Rd + Rv \quad (16)$$

In this way, as shown in the expressions (6), (15), and (16), the coordinate Cv (Cvx, Cvy, Cvz) is represented by the coordinate Cd (Cdx, Cdy, Cdz). The conversion calculation section 17 uses these expressions, in the display mode M4, to generate the look-up table 18A. Then, the coordinate conversion section 14 performs the coordinate conversion using the look-up table 18A.

Figure 16:
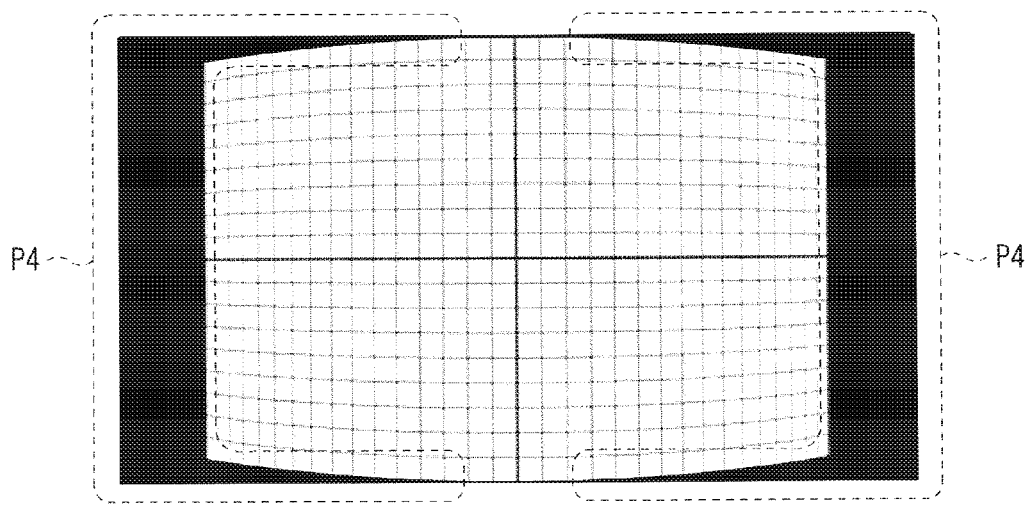
FIG. 16 is an explanatory diagram illustrating one example of a frame image in a case where the coordinate conversion illustrated in FIG. 15 is performed.

FIG. 16 illustrates one example of the frame image F4 after the coordinate conversion in a case where the coordinate conversion is performed on the frame image F3 illustrated in FIG. 4A. In the display mode M4, by performing the coordinate conversion, the horizontal width of the image is narrowed, and the vertical height of the image is shortened as shifts from the center toward the right and the left sides. Consequently, as illustrated in FIG. 16, in the frame images F4 after the coordinate conversion, a part P4 with no luminance information occurs.

The image extension section 13 generates, based on the extension range information IE, the peripheral image FP and extends the frame image F2 by adding the peripheral image FP to the frame images F2 to generate the frame images F3. It is therefore possible, in the display device 1, to reduce a possibility of occurrence of the part P4 as illustrated in FIG. 16 in the displayed image displayed on the display section 30, and to improve image quality.

(Display Mode M5: Non-Conversion Mode)

The display mode M5 is a mode where the virtual screen Sv coincides with the actual display screen Sd of the display section 30. In the display mode M5, the conversion calculation section 17 uses the following expressions to generate the look-up table 18A, and the coordinate conversion section 14 performs the coordinate conversion using the look-up table 18A.

Numerical Expression 17

$$\begin{cases} Cvx = Cdx \\ Cvy = Cdy \\ Cvz = Cdz \end{cases} \quad (17)$$

The coordinate conversion section 14 outputs the input frame image F3 as the frame image F4 as it is. In this case, unlike the display modes M1 to M4, no coordinate conversion is performed on the frame image F4. Therefore, no part without luminance information occurs along a left side or a right side and the like of the frame image F4. Consequently, the conversion calculation section 17 instructs the image extension section 13 not to extend the frame image F2 by way of the extension range information IE. The image extension section 13 refrains from extending the frame image F2, based on the extension range information IE, and outputs the frame image F2 as the frame image F3 as it is.

(Display Mode M6: Automatic Mode)

The automatic mode M6 is a mode where a selection from the display modes M1 to M5 is performed based on the contents of the image to be displayed. Specifically, the control unit 15 selects one of the display modes M1 to M5, based on the genre information IJ. The conversion calculation section 17 generates the look-up table 18A and the extension range information IE in accordance with selected one of the above-mentioned display modes M1 to M5. The image extension section 13 generates, based on the extension range information IE, the peripheral image FP and extends the frame image F2 by adding the peripheral image FP to the frame image F2 to generate the frame image F3. The coordinate conversion section 14 performs the coordinate conversion on the frame image F3 using the look-up table 18A to generate the frame image F4.

Next, detailed description is given in order on various operations performed by the control section 15.

(Operation of Selection of Display Mode)

Figure 17:
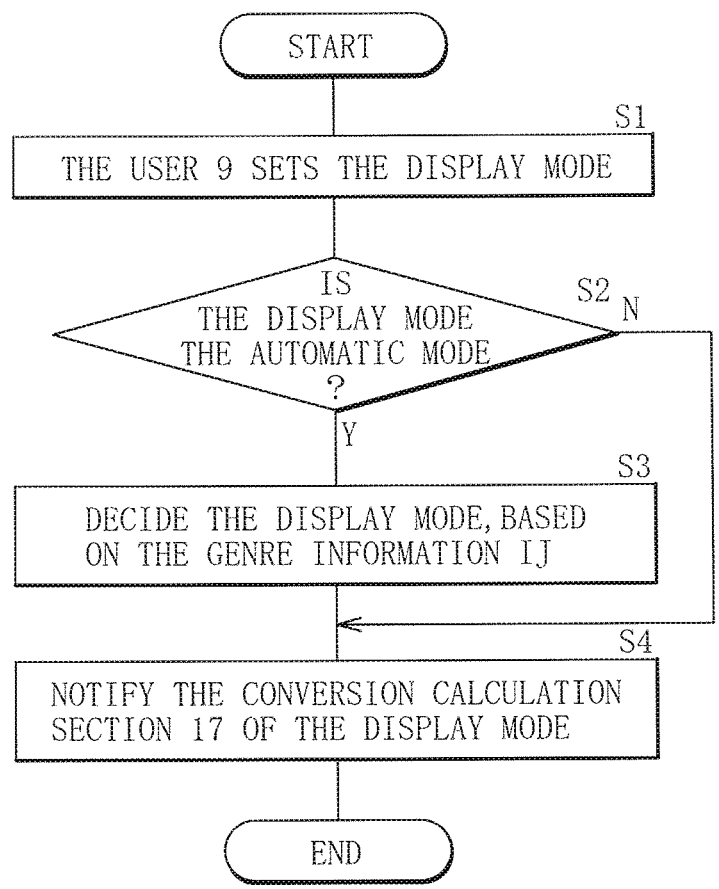
FIG. 17 is a flowchart illustrating one example of an operation of a control section illustrated in FIG. 1.

FIG. 17 illustrates one operation example of the selection of the display mode. The control section 15 selects, based on an instruction from the input interface 40, the display mode and notifies the conversion calculation section 17 of the selected display mode. The details is as follows.

First the user 9 sets the display mode (step S1). Specifically, first, the user 9 notifies the display device 1 through the input interface 40 that the display mode is to be set. In response to the instruction from the user 9, the graphics generation section 15A of the control unit 15 generates a setting screen Posd1 of the display mode as the OSD picture Posd. The superimposition section 12 generates the frame image F2 by superimposing the setting screen Posd1 on the frame image F1. As a result, on the display section 30, the frame image F4 including the setting screen Posd1 is displayed.

Figure 18:
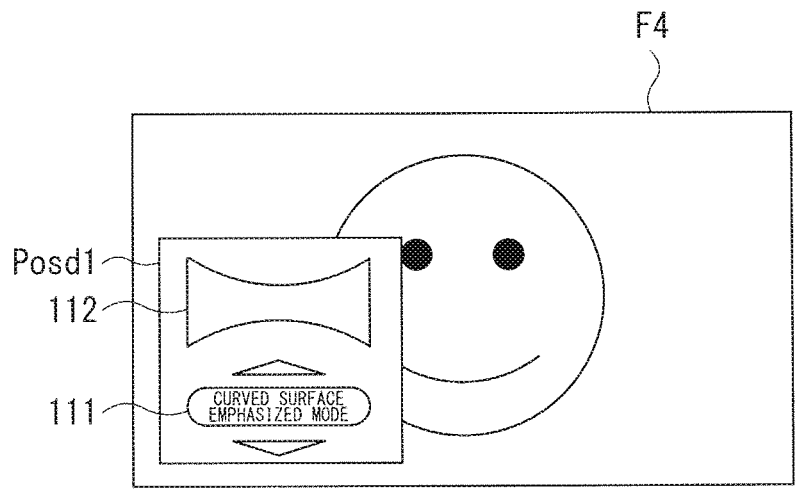
FIG. 18 is an explanatory diagram illustrating one example of a setting screen in the operation illustrated in FIG. 17.

FIG. 18 illustrates one example of the setting screen Posd1 of the display mode. In the setting screen Posd1, there are displayed a name 111 of the display mode to be selected (in this example, "curved surface emphasized mode" (display mode M3)) and a sample image 112 in the display mode. The user 9 operates the input interface 40 to select one of the display modes M1 to M6. At this time, as the user changes the display modes, the sample image 112 also changes in accordance with the change of the display modes. It is therefore possible for the user 9 to select the display mode while understanding intuitively how display is performed in each of the display modes.

Next, the control section 15 confirms whether the selected display mode is the display mode M6 (the automatic mode) or not (step S2). When the selected display mode is the display mode M6 (the automatic mode), the procedure proceeds to step S3. When not the display mode M6 (the automatic mode), the procedure proceeds to step S4.

In step S2, when the selected display mode is the display mode M6 (the automatic mode), the control section 15 decides the display mode, based on the genre information IJ (step S3). Examples of genres indicated by the genre information IJ may include news/report, sports, information/TV-show, drama, music, variety-program, movie, anime/special-effects, documentary/share, theater/performance, hobby/education, walfare, and so on. For example, when a genre indicated the genre information IJ is "news/report," the control section 15 selects the display mode M2 (the flat surface display mode). Thus, distortion in the displayed image is corrected, and the user 9 feels as if he or she was watching the displayed image on an ordinary flat surface display. Alternatively, when a genre indicated the genre information IJ is "sports," the control section 15 selects the display mode M3 (the curved surface emphasized mode). Thus, the user 9 enjoys watching sports with the feeling of presence.

Next, the control section 15 notifies the conversion calculation section 17 of the selected display mode as the mode information IM (step S4). Thereafter, the image processing section 10 performs processing, based on the selected display mode.

The flow is completed by the procedure above.

(Operation of Decision of Viewpoint Position Information IVP)

Figure 19:
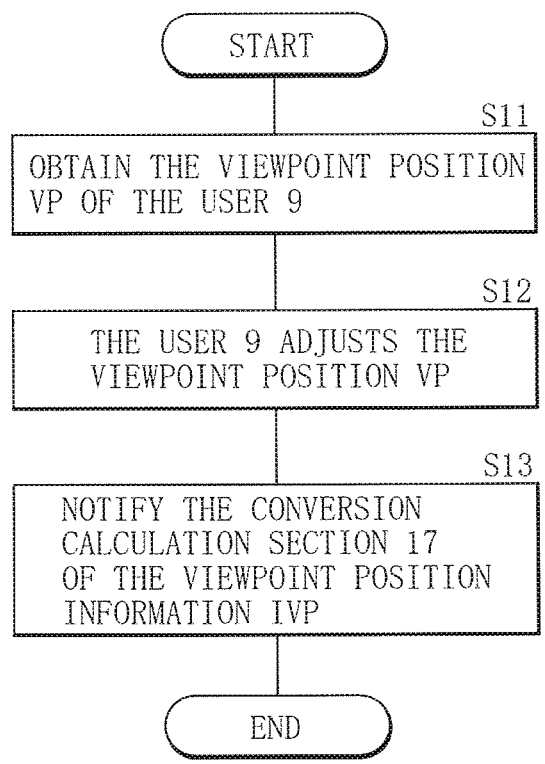
FIG. 19 is a flowchart illustrating another example of the operation of the control section illustrated in FIG. 1.

FIG. 19 illustrates one example of a decision operation of the viewpoint position information IVP. The control section 15 obtains the viewpoint position information IVP of the user 9 from the viewpoint detection section 20, and supplies the obtained viewpoint position information IVP to the conversion calculation section 17 after adjustment by the user 9. The details is as follows.

First, the control section 15 obtains the viewpoint position information IVP of the user 9 from the viewpoint detection section 20 (step S11). It is to be noted that in this example, the viewpoint detection section 20 obtains the viewpoint position VP and supplies the viewpoint position VP to the control section 15, but this is not limitative. Instead, for example, a camera of the viewpoint detection section 20 may take a picture of the user 9 and send the picture to the control section 15, and the control unit 15 may obtain the viewpoint position VP based on the picture.

Next, the user 9 adjusts the viewpoint position VP (step S12). Specifically, first, the user 9 notifies the display device 1 through the input interface 40 that an adjustment of the viewpoint position VP is to be performed. In response to the instruction from the user 9, the graphics generation section 15A of the control section 15 generates an adjustment screen Posd2 of the viewpoint position VP as the OSD picture Posd. The superimposition section 12 superimposes the adjustment screen Posd2 on the frame image F1 to generate the frame image F2. As a result, on the display section 30, the frame image F4 including the adjustment screen Posd2 is displayed.

Figure 20:
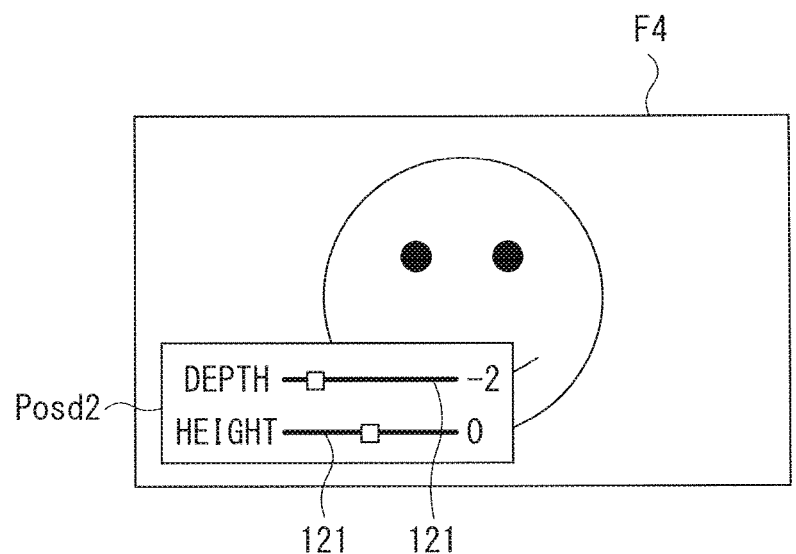
FIG. 20 is an explanatory diagram illustrating one example of an adjustment screen in the operation illustrated in FIG. 19.

FIG. 20 illustrates one example of the adjustment screen Posd2 of the viewpoint position VP. In the adjustment screen Posd2, there is displayed an adjustment bar 121 for the adjustment of the viewpoint position VP (in this example, "depth" and "height"). The user 9 operates the input interface 40 to adjust the viewpoint position VP. It is to be noted that in this example, as the value of the "depth" increases, the viewpoint position VP is adjusted to get closer to the display screen Sd, and as the value of the "depth" decreases, the viewpoint position VP is adjusted to be farther away from the display screen Sd. Also in this example, as the value of the "height" increases, the viewpoint position VP is adjusted to be higher than a height of the center point CPd of the display screen Sd, and as the value of the "height" decreases, the viewpoint position VP is adjusted to be lower than the height of the center point CPd.

Next, the control section 15 notifies the conversion calculation section 17 of the adjusted viewpoint position VP as the viewpoint position information IVP (step S13). Thereafter, the image processing section 10 performs processing based on the adjusted viewpoint position VP.

The flow is completed by the procedure above.

(Operation of Decision of Shape of Virtual Screen Sv)

Figure 21:
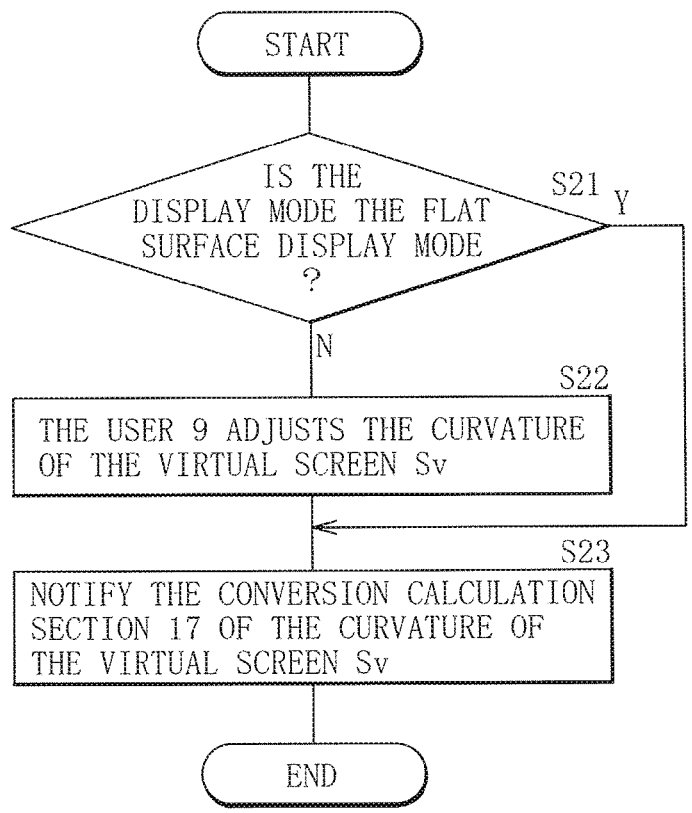
FIG. 21 is a flowchart illustrating another example of the operation of the control section illustrated in FIG. 1.

FIG. 21 illustrates one example of decision operation of the shape of the virtual screen Sv. The control section 15 decides, based on an instruction from the input interface 40, the shape of the virtual screen Sv and notifies the conversion calculation section 17 of the thus-decided shape of the virtual screen Sv. The details is as follows.

First, the control section 15 confirms whether the selected display mode is the display mode M2 (the flat surface display mode) or not (step S21). When the selected display mode is not the display mode M2, the procedure proceeds to step S22. When the selected display mode is the display mode M2, the procedure proceeds to step S23.

In step S21, when the selected display mode is not the display mode M2, the user 9 adjusts the curvature of the virtual screen Sv (step S22). Specifically, first, the user 9 notifies the display device 1 through the input interface 40 that an adjustment of the curvature of the virtual screen Sv is to be performed. In response to the instruction from the user 9, the graphics generation section 15A of the control section 15 generates an adjustment screen Posd3 of the curvature of the virtual screen Sv as the OSD picture Posd. The superimposition section 12 superimposes the adjustment screen Posd3 on the frame image F1 to generate the frame image F2. As a result, on the display section 30, the frame image F4 including the adjustment screen Posd3 is displayed.

Figure 22:
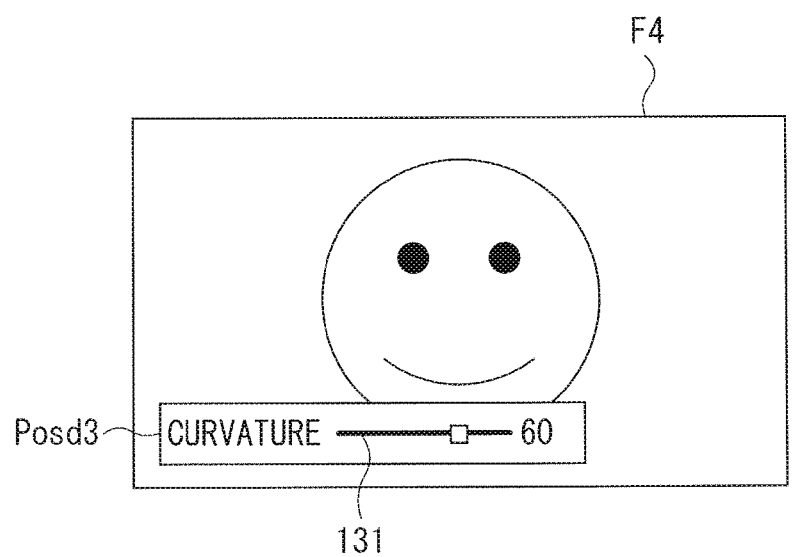
FIG. 22 is an explanatory diagram illustrating one example of an adjustment screen in the operation illustrated in FIG. 21.

FIG. 22 illustrates one example of the adjustment screen Posd3 of the curvature of the virtual screen Sv. In the adjustment screen Posd3, there is displayed an adjustment bar 131 for the adjustment of the curvature. The user 9 operates the input interface 40 to adjust the curvature of the virtual screen Sv. It is to be noted that in this example, the curvature may be set within a range of 0 to 100 both inclusive, and as the value of the curvature increases, the virtual screen Sv is curved more tightly.

Next, the control section 15 notifies the conversion calculation section 17 of the adjusted curvature of the virtual screen Sv as the virtual screen shape information ISv (step S23). Thereafter, the image processing section 10 performs processing, based on the adjusted curvature of the virtual screen Sv.

The flow is completed by the procedure above.

(Operation of Decision of Shape of Display Screen Sd)

Figure 23:
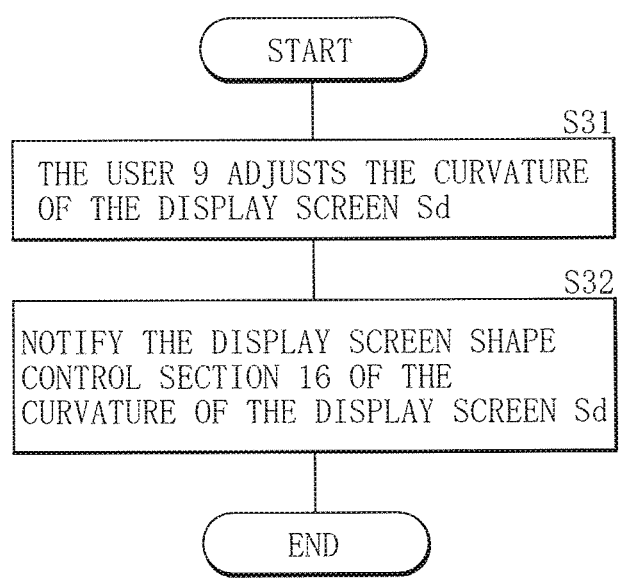
FIG. 23 is a flowchart illustrating another example of the operation of the control section illustrated in FIG. 1.

FIG. 23 illustrates one example of decision operation of the shape of the display screen Sd. The control section 15 decides, based on an instruction from the input interface 40, the shape of the display screen Sd and notifies the conversion calculation section 17 of the thus-decided shape of the display screen Sd. The details is as follows.

First, the user 9 adjusts the curvature of the display screen Sd (step S31). Specifically, first, the user 9 notifies the display device 1 through the input interface 40 that an adjustment of the curvature of the display screen Sd is to be performed. In response to the instruction from the user 9, the graphics generation section 15A of the control section 15 generates an adjustment screen Posd4 of the curvature of the display screen Sd as the OSD picture Posd. The superimposition section 12 superimposes the adjustment screen Posd4 on the frame image F1 to generate the frame image F2. As a result, on the display section 30, the frame image F4 including the adjustment screen Posd4 is displayed. As the adjustment screen Posd4, the same one as the adjustment screen Posd3 illustrated in FIG. 22 may be used.

Next, the control section 15 notifies the display screen shape control section 16 of the adjusted curvature of the display screen Sd as the display screen shape information ISd (step S32). Thereafter, the display device 1 performs processing, based on the adjusted curvature of the display screen Sd.

The flow is completed by the procedure above.

(Detailed Operation of Conversion Calculation Section 17)

Next, detailed description is given on an operation of the conversion calculation section 17.

Figure 24:
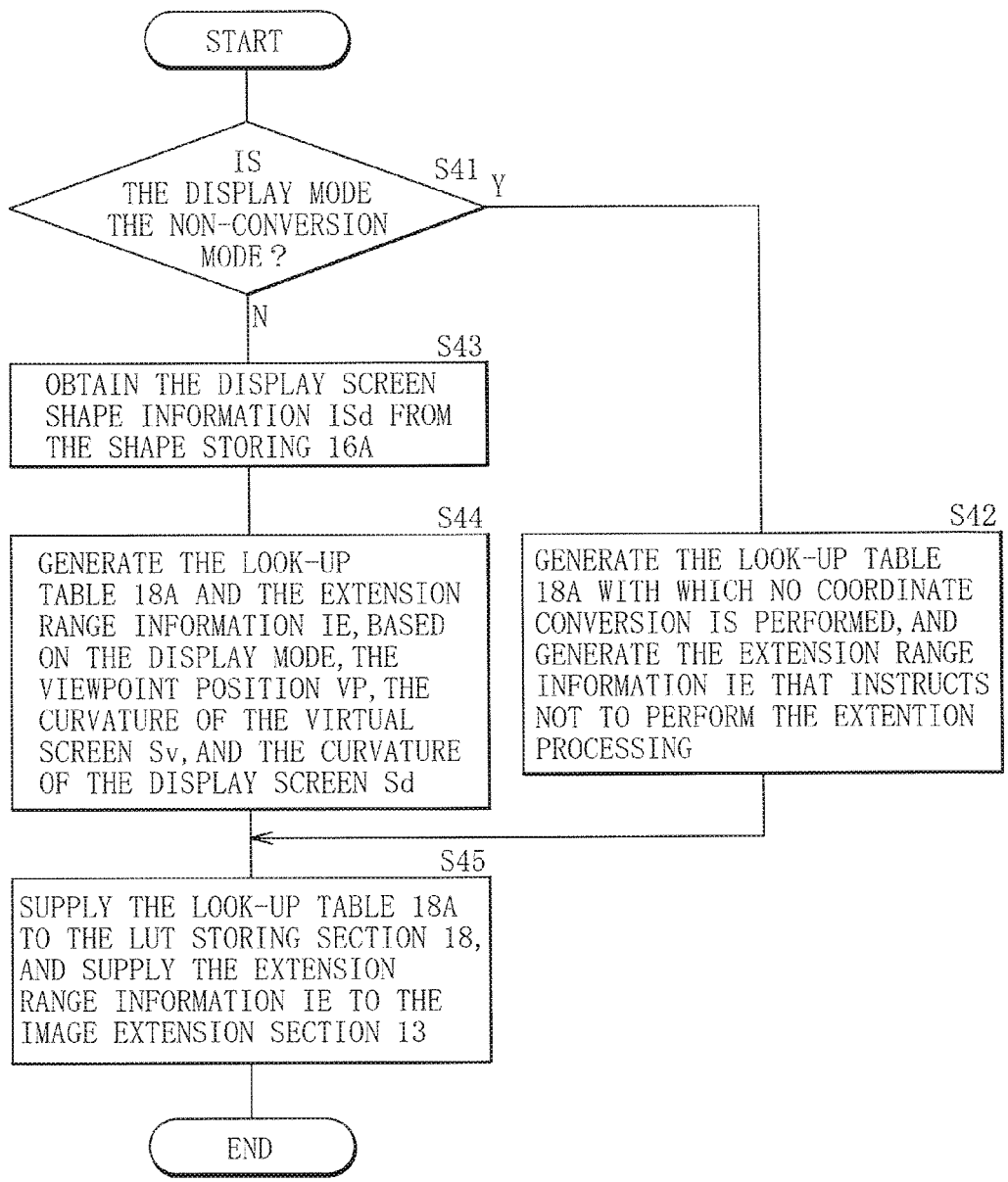
FIG. 24 is a flowchart illustrating one example of an operation of the coordinate conversion section illustrated in FIG. 1.

FIG. 24 illustrates one example of an operation of the conversion calculation section 17. The conversion calculation section 17 generates the look-up table 18A and the extension range information IE, based on the mode information IM, the viewpoint position information IVP, and the virtual screen shape information ISv that are supplied from the control section 15, and on the display screen shape information ISd that is stored in the shape storing section 16A of the display screen shape control section 16. The details is as follows.

First, the conversion calculation section 17 confirms whether the display mode is the display mode M5 (the non-conversion mode) or not (step S41). When the display mode is the display mode M5 (the non-conversion mode), the conversion calculation section 17 generates the look-up table 18A with which no coordinate conversion is performed, and generates the extension range information IE that instructs not to perform the image extension processing (step S42), and the procedure proceeds to step S45. When the display mode is not the display mode M5 (the non-conversion mode), the procedure proceeds to step S43.

In step S41, when the display mode is not the display mode M5 (the non-conversion mode), the conversion calculation section 17 generates the look-up table 18A and the extension range information IE, based on the display mode, the viewpoint position VP, the curvature of the virtual screen Sv, and the curvature of the display screen Sd (step S44). Specifically, the conversion calculation section 17 obtains the look-up table 18A using the expressions corresponding to any one of the above-described display modes, based on the display mode supplied from the control section 15 through the mode information IM, the viewpoint position VP supplied from the control section 15 through the viewpoint position information IVP, the curvature of the virtual screen Sv supplied from the control section 15 through the virtual screen shape information ISv, and the curvature of the display screen Sd obtained from the display screen shape information ISd stored in the shape storing section 16A. Then, the conversion calculation section 17 determines to what extent the frame image F2 is to be extended in the image extension section 13, and generates the extension range information IE.

Next, the conversion calculation section 17 supplies the look-up table 18A to the LUT storing section 18, and supplies the extension range information IE to the image extension section 13 (step S45). Thereafter, the image extension section 13 extends, based on the extension range information IE, the frame image F2 to generate the frame image F3, and the coordinate conversion section 14 performs the coordinate conversion on the frame image F3 using the look-up table 18A to generate the frame image F4.

The flow is completed by the procedure above.

[Effects]

As described above, in the example embodiment, the image extension section extends the frame image, and the coordinate conversion section performs the coordinate conversion on the extended frame image. It is therefore possible to enhance the feeling of presence and to improve image quality.

Also, in the example embodiment, the conversion calculation section determines to what extent the frame image is to be extended in the image extension section. It is therefore possible to save an amount of calculation and processing time for the image extension processing in the image extension section, and to save an amount of memory for the image extension processing.

Modification Example 1

In the above-described embodiment, the user 9 uses the input interface 40 to set the curvature of the display screen Sd, but this not limitative. Instead, for example, the user 9 may directly make the display screen Sd of the display section curved. In the following, detailed description is given on a modification example.

Figure 25:
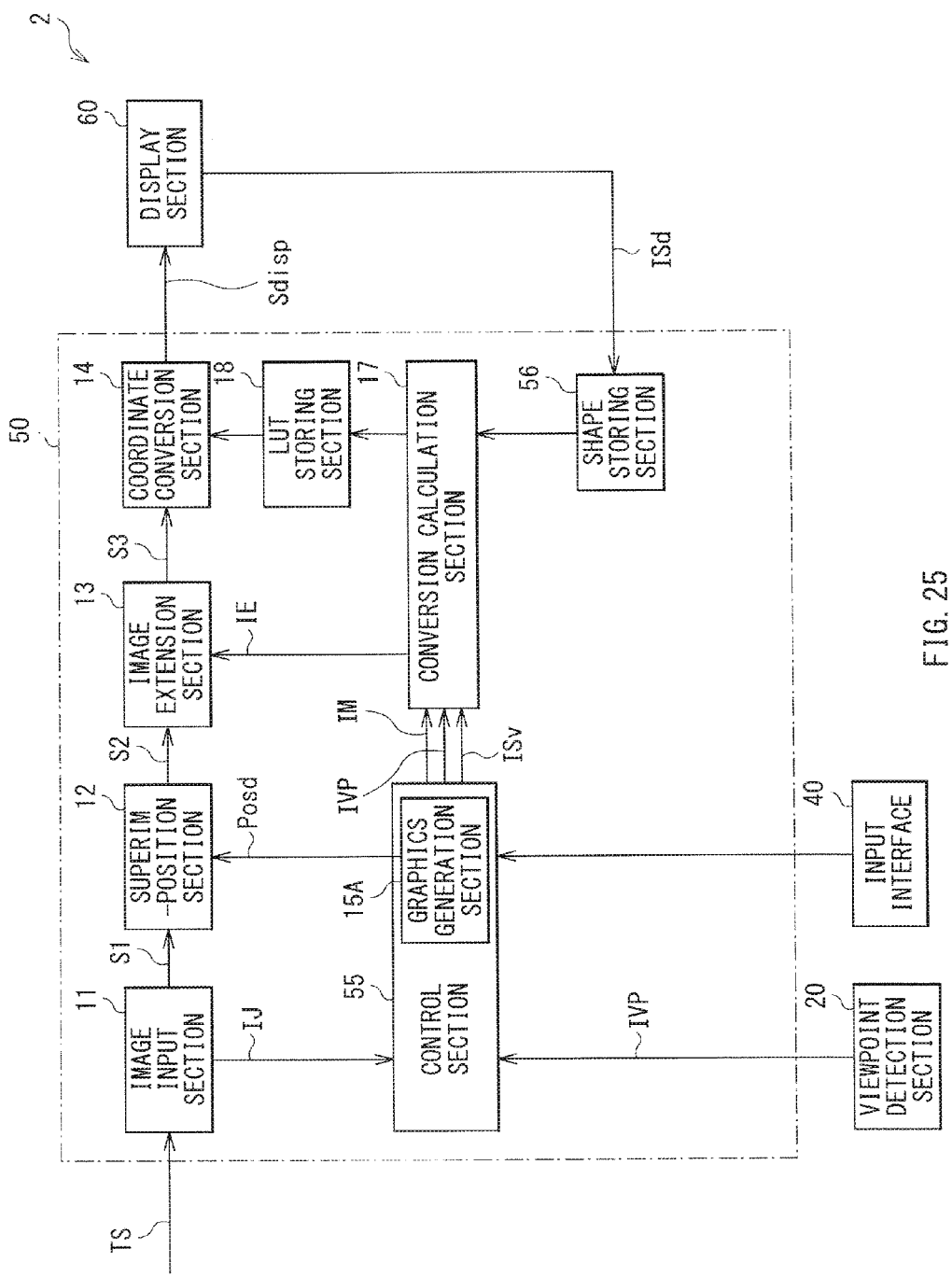
FIG. 25 is a block diagram illustrating one example of a configuration of a display device according to a modification example.

FIG. 25 illustrates one example of a configuration of a display device 2 according to one modification example. The display device 2 includes a display section 60 and an image processing section 50.

The display section 60 is configured to perform display based on an image signal Sdisp. Also, the display section 60 is configured to allow the user 9 to directly make a display screen Sd curved. The display section 60 is configured to generate, based on a shape of the display screen Sd, display screen shape information ISd and to supply the thus-generated display screen shape information ISd to the image processing section 50.

The image processing section 50 includes a control section 55 and a shape storing section 56. The control section 55 is similar to the control section 15 in the above-described embodiment except that the function of generating the display screen shape information ISd is omitted. The shape storing section 56 is similar to the shape storing section 16A, and is configured to store the display screen shape information ISd supplied from the display section 60.

In the above-described configuration, it is also possible to obtain similar effects to the display device 1.

Modification Example 2

In the above-described embodiment, the conversion calculation section 17 determines to what extent the frame image F2 is to be extended in the image extension section 13, but this not limitative. Instead, for example, the image extension section may extend the frame image F2 uniformly by a predetermined amount. In the following, detailed description is given on a modification example.

Figure 26:
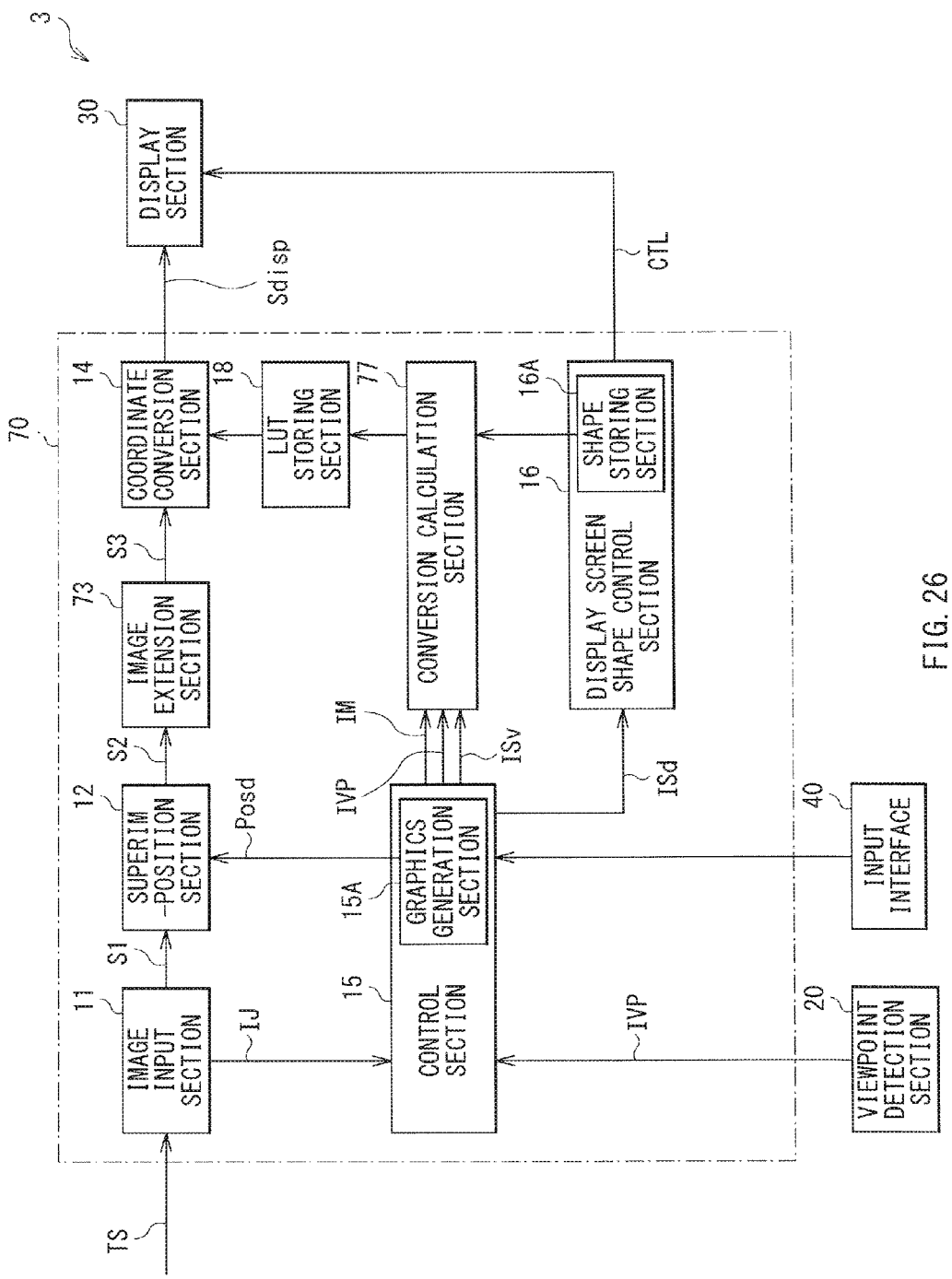
FIG. 26 is a block diagram illustrating one example of a configuration of a display device according to another modification example.

FIG. 26 illustrates one example of a configuration of a display device 3 according to one modification example. The display device 3 includes an image processing section 70. The image processing section 70 includes an image extension section 73 and a conversion processing section 77. The image extension section 73 is configured to extend the frame image F2 uniformly by a predetermined amount to generate the frame image F3. The conversion processing section 77 is similar to the conversion calculation section 17 except that the function of generating the extension range information IE is omitted.

In the above-described configuration, similarly to the display device 1, it is possible to enhance the feeling of presence, and to improve image quality.

Modification Example 3

In the above-described embodiment, the display section 30 is configured to allow the curvature of the display screen to be varied, but this not limitative. Instead, a display section with a fixed curvature of a display screen may be used.

Although description has been made by giving the example embodiments and the modification examples thereof as mentioned above, the contents of the present technology are not limited to the above-mentioned embodiments and so forth and may be modified in a variety of ways.

For example, in the above-described embodiments and so forth, the six operation modes M1 to M6 are provided, but this is not limitative. It is possible to provide some of them, or to provide other operation modes in addition to them. Specifically, for example, it is possible to provide another operation mode with different expressions for the coordinate conversion from the expressions of the operation modes M1 to M5.

Moreover, for example, in the above-described embodiments and so forth, in the automatic mode M6, the control section 15 selects the display mode, based on the genre information IJ, but this is not limitative. The control section 15 may select the display mode, based on other information.

Further in the above-described embodiments and so forth, the description is given on the display device with an organic EL display section or the like, but this is not limitative. Applications may include, for example, a projector.

It is to be noted that the effects described herein are illustrative and non-limiting, and other effects may be achieved.

It is possible to achieve at least the following configurations from the above-described example embodiments of the technology.

(1) An image processing device, including:
an image generation section configured to generate a peripheral image in an outer periphery of a first frame image to generate a second frame image that includes the first frame image and the peripheral image; and
a coordinate conversion section configured to perform coordinate conversion on the second frame image to generate a third frame image.

(2) The image processing device according to (1),
wherein the coordinate conversion section obtains, based on a characteristic of the coordinate conversion, an image generation range where the peripheral image is to be generated, and
the image generation section generates the peripheral image within the image generation range.

(3) The image processing device according to (1), wherein the image generation section generates the peripheral image within a fixed image generation range.

(4) The image processing device according to any one of (1) to (3), wherein the third frame image is configured to be displayed on a display section having a display screen of a curved surface.

(5) The image processing device according to (4), wherein the display section is configured to allow a curvature of the display screen to be varied.

(6) The image processing device according to (4) or (5), wherein the coordinate conversion section includes a look-up table and performs, based on the look-up table, the coordinate conversion, the look-up table indicating a relationship between a coordinate in the second frame image and a coordinate in the third frame image.

(7) The image processing device according to (6), wherein the coordinate conversion section generates the look-up table in accordance with a shape of the display screen of the display section.

(8) The image processing device according to (6) or (7), wherein the coordinate conversion section decides, based on a content of the first frame image, a shape of a virtual screen and generates, based on the shape of the virtual screen, the look-up table, the shape of the virtual screen being different from a shape of the display screen of the display section.

(9) The image processing device according to (8), wherein the coordinate conversion section includes a plurality of display modes that differ in the shape of the virtual screen from one another, and decides the shape of the virtual screen by selecting, based on the content, one of the plurality of the display modes.

(10) The image processing device according to any one of (6) to (9), wherein the coordinate conversion section decides, based on an instruction from a user, a shape of a virtual screen and generates, based on the shape of the virtual screen, the look-up table, the shape of the virtual screen being different from a shape of the display screen of the display section.

(11) The image processing device according to any one of (6) to (10), wherein the coordinate conversion section generates the look-up table, based on a viewpoint position of a user.

(12) The image processing device according to (11), wherein the coordinate conversion section obtains, based on the viewpoint position and on an instruction from the user, a virtual viewpoint position and generates, based on the virtual viewpoint position, the look-up table.

(13) The image processing device according to any one of (1) to (12), wherein the image generation section generates the peripheral image, based on the first frame image.

(14) The image processing device according to (13), wherein the first frame image includes one or more partial images, and the image generation section generates the peripheral image by arranging one or more images that are same as the respective one or more partial images in the outer periphery of the first frame image.

(15) The image processing device according to (14), wherein the one or more partial images include an image adjacent to at least one of four sides of the first frame image within the first frame image.

(16) The image processing device according to (14) or (15), wherein the one or more partial images include a partial image that is adjacent to one of two or more matching images, the two or more matching images being selected by pattern matching within the first frame image.

(17) The image processing device according to any one of (1) to (16), wherein
the image generation section is supplied with a series of the first frame images on a time axis,
the image generation section generates, based on one of the series of the first frame images, one peripheral image and generates, based on the first frame image subsequent to the one of the series of the first frame images and on the one peripheral image, the second frame image.

(18) An image processing method, including:
generating a peripheral image in an outer periphery of a first frame image to generate a second frame image that includes the first frame image and the peripheral image; and
performing coordinate conversion on the second frame image to generate a third frame image.

(19) A display device, including:
an image generation section configured to generate a peripheral image in an outer periphery of a first frame image to generate a second frame image that includes the first frame image and the peripheral image;
a coordinate conversion section configured to perform coordinate conversion on the second frame image to generate a third frame image; and a display section configured to perform display operation, based on the third frame image.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
an image generation circuitry configured to generate a peripheral image in an outer periphery of a first frame image to generate a second frame image that includes the first frame image and the peripheral image; and
a coordinate conversion circuitry configured to
decide a shape of a virtual screen, the shape of the virtual screen being different from a shape of a display screen of a display circuitry,
generate a look-up table based at least in part on the shape of the virtual screen,
perform coordinate conversion on the second frame image based on the look-up table to generate a third frame image, the look-up table indicating a relationship between a coordinate in the second frame image and a coordinate in the third frame image, the third frame image is configured to be displayed on the display circuitry having the display screen with a curved surface, and
obtain an image generation range where the peripheral image is to be generated based on a characteristic of the coordinate conversion,
wherein the image generation circuitry is configured to generate the peripheral image within the image generation range, and
wherein the peripheral image comprises a portion of the first frame image.

2. The image processing device according to claim 1, wherein the display circuitry is configured to allow a curvature of the display screen to be varied.

3. The image processing device according to claim 1, wherein the coordinate conversion circuitry generates the look-up table based at least in part on the shape of the display screen of the display circuitry.

4. The image processing device according to claim 1, wherein the coordinate conversion circuitry decides, based on a content of the first frame image, the shape of the virtual screen.

5. The image processing device according to claim 4, wherein the coordinate conversion circuitry includes a plurality of display modes that differ in the shape of the virtual screen from one another, and decides the shape of the virtual screen by selecting, based on the content, one of the plurality of display modes.

6. The image processing device according to claim 1, wherein the coordinate conversion circuitry decides, based on an instruction from a user, the shape of the virtual screen.

7. The image processing device according to claim 1, wherein the coordinate conversion circuitry generates the look-up table based at least in part on a viewpoint position of a user.

8. The image processing device according to claim 7, wherein the coordinate conversion circuitry obtains, based on the viewpoint position and on an instruction from the user, a virtual viewpoint position and generates, based at least in part on the virtual viewpoint position, the look-up table.

9. The image processing device according to claim 1, wherein the first frame image includes one or more partial images, and the image generation circuitry generates the peripheral image by arranging one or more images that are same as the respective one or more partial images in the outer periphery of the first frame image.

10. The image processing device according to claim 9, wherein the one or more partial images include an image adjacent to at least one of four sides of the first frame image within the first frame image.

11. The image processing device according to claim 9, wherein the one or more partial images include a partial image that is adjacent to one of two or more matching images, the two or more matching images being selected by pattern matching within the first frame image.

12. The image processing device according to claim 1, wherein the image generation range is correlated with an amount of a distortion generated by the coordinate conversion.

13. The image processing device according to claim 1, wherein
the first frame image comprises a plurality of first frame images including a first image and second image, the first image preceding the second image,
the image generation circuitry is supplied with a series of the plurality of first frame images on a time axis,
the image generation circuitry generates, based on the first image and the second image, the peripheral image in an outer periphery of the second image.

14. The image processing device according to claim 1, wherein the image generation range where the peripheral image is to be generated is a dynamic peripheral image generation range.

15. An image processing method, the method comprising:
generating, with an image generation circuitry, a peripheral image in an outer periphery of a first frame image to generate a second frame image that includes the first frame image and the peripheral image;
deciding, with a coordinate conversion circuitry, a shape of a virtual screen, the shape of the virtual screen being different from a shape of a display screen of a display circuitry;
generating, with the coordinate conversion circuitry, a look-up table based at least in part on the shape of the virtual screen;
performing, with the coordinate conversion circuitry, a coordinate conversion on the second frame image based on the look-up table to generate a third frame image, the look-up table indicating a relationship between a coordinate in the second frame image and a coordinate in the third frame image, the third frame image is configured to be displayed on the display circuitry having the display screen with a curved surface; and
obtaining, with the coordinate conversion circuitry, an image generation range where the peripheral image is to be generated based on a characteristic of the coordinate conversion,
wherein generating the peripheral image includes generating the peripheral image within the image generation range, and
wherein the peripheral image comprising a portion of the first frame image.

16. The image processing method according to claim 15, wherein the image generation range where the peripheral image is to be generated is a dynamic peripheral image generation range.

17. A display device, comprising:
  an image generation circuitry configured to generate a peripheral image in an outer periphery of a first frame image to generate a second frame image that includes the first fame image and the peripheral image;
  a coordinate conversion circuitry configured to
    decide a shape of a virtual screen,
    generate a look-up table based at least in part on the shape of the virtual screen,
    perform coordinate conversion on the second frame image based on the look-up table to generate a third frame image, the look-up table indicating a relationship between a coordinate in the second frame image and a coordinate in the third frame image, and
    obtain an image generation range where the peripheral image is to be generated based on a characteristic of the coordinate conversion; and
  a display circuitry configured to perform a display operation based on the third frame image, the third frame image is configured to be displayed on the display circuitry having a display screen with a curved surface, wherein a shape of the display screen of the display circuitry is different from the shape of the virtual screen,
  wherein the image generation circuitry is configured to generate the peripheral image within the image generation range, and
  wherein the peripheral image comprises a portion of the first frame image.

18. The display device according to claim 17, wherein the image generation range where the peripheral image is to be generated is a dynamic peripheral image generation range.

\* \* \* \* \*